INVENTOR
THOMAS M. HAMILL

BY Charles R. Wetter

ATTORNEY

Oct. 3, 1972 T. M. HAMILL 3,695,931
WET MILLING EXTRACTION PROCESS AND APPARATUS THEREFOR
Filed March 31, 1970 3 Sheets-Sheet 2

INVENTOR
THOMAS M. HAMILL
BY Charles R. Wetter
ATTORNEY

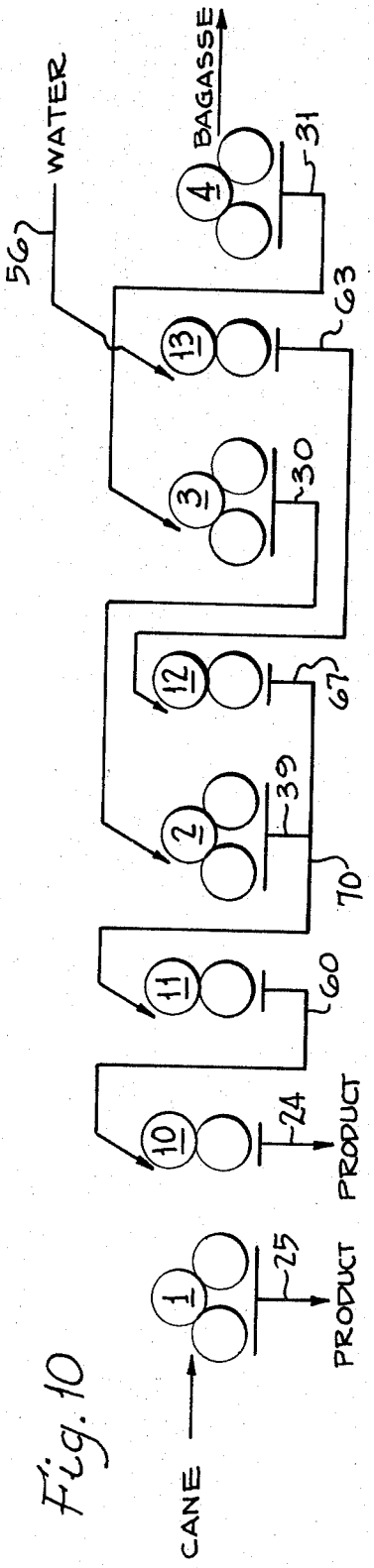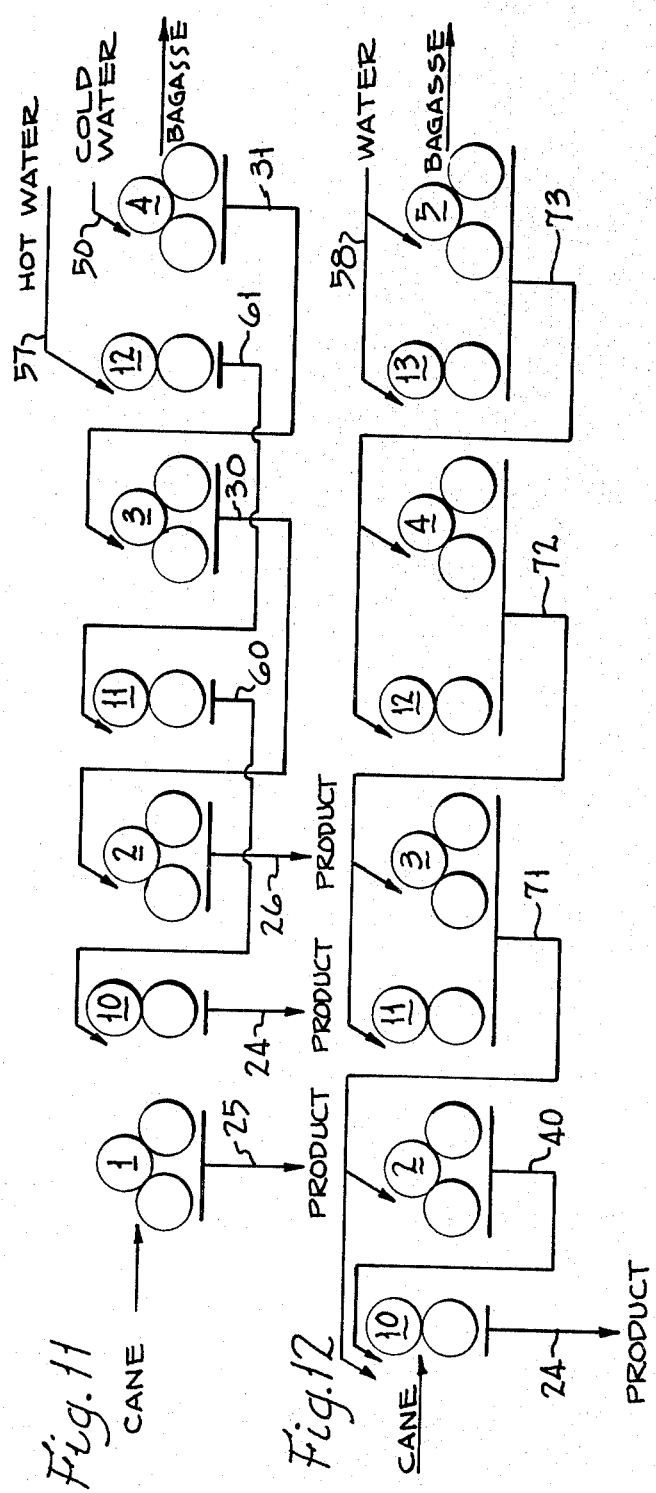

20
United States Patent Office 3,695,931
Patented Oct. 3, 1972

3,695,931
WET MILLING EXTRACTION PROCESS AND APPARATUS THEREFOR
Thomas M. Hamill, 343 Dune Circle, Kailua, Hawaii 96734
Filed Mar. 31, 1970, Ser. No. 24,139
Int. Cl. C13d 1/02, 1/04, 1/12
U.S. Cl. 127—4
31 Claims

ABSTRACT OF THE DISCLOSURE

Milling process and apparatus, for extracting a liquid or a solid from a fibrous material having the liquid or solid entrapped therein. The fibrous material is macerated before each mill with an imbibition liquid which is capable of displacing the entrapped liquid or solid. The macerated fibre is then passed through a series of mills, some which exert high pressure causing expression of the juice and rupture of the fibre cells, and others which exert low pressure causing expression of the juice but without any substantial amount of cell rupture. The juice expressed by each mill with the exception of the product mill is collected and returned to be used as the imbibition liquid for the fibre at a prior mill in the train. This process has particular use in the sugar industry to remove sugar bearing liquid from cane.

BACKGROUND OF INVENTION

In the extraction of liquids from fibrous materials which have the liquid entrapped within, it has been the practice to chop and grind the fibrous material into small pieces and then pass it through an apparatus which expresses the liquid by the application of high pressure. For an efficient extraction, however, the cells of the fibre which contain the liquid must be ruptured and exposed. However, because of the difficulty in obtaining complete rupture of the cells and because of the fibre's own affinity for its liquid, it has long been recognized that an efficient extraction cannot be obtained using pressure alone. Therefore, a process was developed called wet milling which utilizes the technique of maceration to obtain an efficient extraction. In maceration, a liquid, called the imbibition, is contacted with the fibre for the purpose of displacing the entrapped liquid. The fibre is then subjected to high pressure which expresses the mixture of imbibition and natural liquids. If the fibres contain a solid rather than a liquid, maceration is necessary to wash out the solids. The maceration is normally carried out by either spraying, soaking or washing the fibre with the imbibition liquid. If the fibre contains natural juice, the imbibition liquid is usually miscible with the natural juice. If the fibres contain only a solid, the imbibition liquid must be one in which the solid is soluble, or one in which the solid can be suspended.

One of the largest users of this wet milling process is the sugar industry. Sugar is produced commercially by passing the ground cane stalks, which have large amounts of sugar-bearing juice entrapped in their cells, through a series of high pressure mills, called the mill train, or mill tandem, which express the juice. After the cane has been chopped and ground, it is subjected to a wet milling stage. In early attempts, water alone was used as the imbibition liquid for the maceration of the cane prior to its entrance into each mill in the wet milling section of a mill tandem. Because of the miscibility between the water and juice and the concentration gradient of the solids between these two liquids, the mill expressed a dilute juice having some sugar dissolved therein. Because of the increased volume of expressed dilute juice, the total amount of sugar recovered would be greater than the amount which could be obtained by the expression of natural juice alone. It was found, however, that large quantities of water were required to even approach an efficient extraction. Since the water must eventually be evaporated to recover the solid sugar, the cost of using it as the sole imbibition liquid became prohibitive.

A technique was then developed which utilized water only to form the basis of the imbibition liquid. In this method, water is added as the imbibition liquid near the end of the mill train, usually at the last mill. The juice extracted by this mill would be collected and returned as the imbibition liquid for a prior mill in the train. This procedure of collection and return would be repeated from mill to mill in counter-current fashion to the direction of travel of the cane. Thus, a fairly rich juice was expressed by the mill at the front of the wet section which was drawn off as product and processed further to recover the sugar.

While the use of maceration does result in improved extraction, it also presents some difficulties. It was found that high moisture contents in the cane made feeding of the mill more difficult. The mill rollers tended to slip on the wet cane and the frequency of mill chokes increased. In order to overcome this problem, it was necessary to reduce the moisture content, or the mill speed. The reduction in mill speed required a reduction of the feed rate which, of course, resulted in a loss of capacity in the mill train. This loss of capacity offset the gain in extraction from the use of maceration. Reduction of the moisture content of the cane, on the other hand, decreased the extraction efficiency.

In a separate development in the technique of maceration, it was found that if the cell walls of the cane were heated to above about 180° F., they tended to disintegrate, thus exposing the rich juice. At first, it was thought that this phenomenon could be utilized to further rupture the cell walls. Attempts were made to macerate the cane with a hot imbibition liquid. However, it was found that the feeding characteristics of the cane were greatly reduced when hot maceration was used. Due to the increased frequency of mill chokes, this technique is not often used in commercial milling operations.

Attempts were made to overcome these feeding difficulties by forcing the cane into the mill. A continuous pressure feed mill was devised which utilized two light pressure rollers which co-acted on the cane prior to its entrance into a regular high pressure mill. The cane discharged by these feed rollers was forced through an enclosed trough and into the high pressure mill. The feed rollers extracted a high proportion of thin juice, thus reducing the moisture content of the cane, and presented the high pressure mill with a comparatively dry feed supplied under pressure. The reduced moisture content of the cane restored the feeding capacity of the mill. The juices expressed by both the feed rollers and the mill were collected together and returned as the imbibition liquid for a preceding mill. However, because there was no maceration of the cane between the feed rollers and the regular mill, the mill functioned more as a dry mill rather than a wet one. Although the total juice extracted by such a mill combination may exceed that of a three roller mill, it has been found that the total amount of soluble solids in the juice so extracted may actually be less than that extracted by a comparable three roller mill alone, if the comparison be made at equal rates of cane (bagasse) feed. It is believed that the lack of solids extraction is due to the dry milling which occurs in the three roll mill.

While dry milling is very efficient when the cane contains large amounts of natural juice, it is ineffective after about half of this juice is removed. Therefore, the pressure feed mills, while increasing capacity, actually lower the soluble, solids extraction of the wet milling section.

SUMMARY OF THE INVENTION

It has now been discovered that the prior art disadvantages can be overcome and an improved extraction obtained by utilizing a process hereinafter described as reflux milling. Reflux milling involves the maceration of a fibrous material having a solid or liquid entrapped therein, passing the macerated material through a light pressure mill which expresses the juice without causing any substantial rupture of fibre cells, collecting the expressed juice and returning it as the imbibition liquid for the maceration of the material prior to its entrance into a preceding mill.

In general, this invention comprises an improvement in the wet milling of fibrous material which heretofore used only maceration and a series of high pressure mills to extract the liquid, said improvement comprising the utilization of reflux milling prior to the entrance of macerated material into a high pressure mill.

Particularly, for the sugar industry, this invention comprises a process for extracting sugar bearing juice from sugar cane bagasse by wet milling in a series of mills located in tandem which comprises the steps of (a) macerating the bagasse with a dilute liquid prior to its entrance into each mill, (b) passing macerated bagasse through a tandem of mills which comprises a combination of high pressure mills which express juice and cause further rupturing of the juice bearing cells and low pressure mills which express juice without causing any substantial amount of cell rupture through the application of pressure, (c) collecting the juices expressed by the mills and returning them as imbibition liquids for preceding mills in the tandem, (d) adding fresh imbibition liquid at some point in the mill train and, (e) removing the juice expressed by at least one mill near the front of the tandem as product.

Further, in accordance with the present invention, there is provided apparatus for extracting a liquid or a solid from a fibrous material having the solid or liquid entrapped in the cells thereof. This apparatus comprises means for macerating a fibrous material with a dilute liquid. There is also provided expressing means for removing the liquid from the macerated fibrous material without causing any substantial amount of cell ruptures. Also included are means for macerating the expressed fibrous material with a dilute liquid and expressing means for removing this liquid from the macerated fibrous material and, at the same time, rupturing the cells thereof. There is also provided means for returning the liquid from each expression as imbibition liquid for a prior maceration.

Therefore, it is an object of this invention to provide an improved extraction process.

It is a further object of this invention to provide an improved method of removing sugar bearing liquid from sugar cane.

It is a further object of this invention to provide a method for using both hot and cold maceration simultaneously in a wet milling extraction.

It is an additional object of this invention to provide an extraction process which operates more efficiently than a traditional high pressure extraction process.

It is an additional object of this invention to provide an apparatus which operates with a high extraction efficiency.

Further objects will be apparent from the description and claims which follow:

FIG. 10 is an embodiment of this invention showing four reflux mills and four regular mills operating in tandem with split maceration.

FIG. 11 is an embodiment of this invention showing three reflux mills and four regular mills operating in tandem with split hot and cold maceration.

FIG. 12 is an embodiment of this invention showing four reflux mills and four regular mills using commingled maceration.

Figure 1:
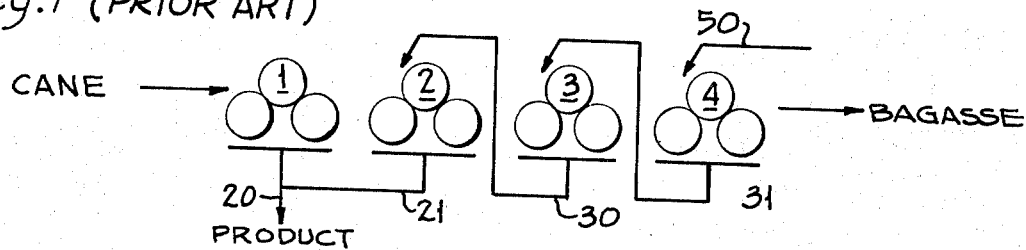
FIG. 1 shows a traditional mill train having four regular mills (high pressure) operating in tandem.

In disclosing the preferred embodiments of this invention, reference will be made to the process of extracting sugar bearing liquid from sugar cane. It should be understood, however, that the instant invention can be used in any extraction in which a rich liquid or a solid is removed from a solid fibrous material utilizing the techniques of displacing the rich liquid or solid with another liquid and then expressing the displaced liquid or solid.

CANE PREPARATION

In the recovery of sugar from sugar cane, it is first necessary to convert the long stalks of cane into short lengths in order to facilitate handling and subsequent feeding to mechanical processing equipment. This is normally carried out by first passing the cane stalks through a machine containing from thirty to sixty rotating knives which cut the stalks into short pieces. Sometimes such cutting is followed by a shredding process (for example, in a hammer-mill like device) or a crushing process in order to rupture as many cane cells as possible. Following cutting and shredding, when included, the prepared cane is sent to a series of roller type mills which further process the cane and extract the juice. In some instances, it is preferable to locate a cane shredder between the first and second roller mills rather than in front of the first. The first roller mill may be of either two or three roller type; subsequent roller mills are normally of the three roller type. The rollers of these mills may have any one of a large variety of types of surfacing, all designed to grip and grind the cane passing between them. The mills are provided with means for exerting extremely high pressures on the cane passing between them so that the cane discharged is a pulpy fibrous mass which is called bagasse.

The preparation of the cane is important in obtaining a good extraction. While any type of cane can be utilized in the practice of this invention, it is preferable to utilize one that has been thoroughly ground and crushed in the heretofore described equipment to insure a uniform rupturing of the cells. Likewise, the thickness of the bagasse blanket as it passes between the mills should not be greater than 40 centimeters to insure proper drainage at the mill. Most commercial mill operations have found that bagasse having a thickness of from 15 to 25 centimeters is the most satisfactory. While an improved extraction can be obtained with this invention regardless of the cane preparation or bagasse thickness, the degree of improvement is dependent upon these factors.

REGULAR MILLS

The mill train normally consists of from four to seven high pressure mills located in tandem. Each mill is usually constructed of three large rollers which co-act to exert pressure on the bagasse at two different points. The three rollers are designated as the feed, top and delivery rollers respectively. The feed and delivery rollers are usually located in the same horizontal plane. The top roller is located parallel to and centrally between and above these rollers. These mills are well known in the art and have been thoroughly described in U.S. Pat. 3,080,915 and in the Handbook or Sugar Cane Engineering by E. Hugot (1960), pages 69 to 223 which are hereby incorporated by reference into the specification. Throughout the specification and claims, these three-roll mills are referred to as regular mills. Mills having two or four or more rollers can also be used; however, it has been found that the optimum milling efficiency is obtained with three-roll mills. The rollers are usually circumferentially grooved to provide adequate feeding and grinding capability and normally have scrapers installed to prevent the grooves from becoming clogged with bagasse. These mills exert a very high pressure on the bagasse which usually averages in the range of from 2,000 to 5,000 p.s.i. and preferably from 3,000 to 4,000 p.s.i. The point of maximum pressure in the bight of the rolls is considerably higher than these average pressures. The average pressure is defined as being the total load exerted by the top roller divided by the roller length and by one tenth of the roller diameter. The rollers normally turn with a linear circumferential speed of from 20 to 70 feet per minute and preferably from 25 to 50 feet per minute. This combination of speed and pressure requires large amounts of power and causes considerable wear on the rollers. Thus, the mills represent a high capital investment and contribute substantially to the overall cost of the process.

REGULAR MILLING

The mill train is further divided into two sections. The first, in which no maceration is used, is called the dry milling section. The second section, in which maceration is applied, is called the wet milling section. The cane, after being chopped and further crushed or shredded (or both) is conveyed to one or more dry mills. This mill, being similar in construction to the wet mills, further grinds the cane and forms the familiar bagasse from the mass of fibres. Because no additional liquid has been added, the juice expressed by this mill is very rich and normally is collected as product and processed further to recover the sugar. This mill usually expresses from 50% to 70% of the original juice in the cane. Normally, only the first or first and second mills of a tandem are used for dry milling.

The bagasse is then conveyed to the wet milling section of the trrain. Prior to its entrance into each mill, the bagasse is macerated with a liquid which is capable of displacing the juice. Water alone is added as the imbibition liquid prior to the last mill to provide the necessary volume of maceration liquid. Occasionally, this water is added at two or more mills near the end of the mill train. The imbibition liquid for the earlier mills, however, is obtained by collecting the dilute juice from the later mills and returning it for the maceration of the earlier mills. Thus, there is provided a source of dilute juice which flows counter-current to the bagasse. This juice becomes richer as it passes from mill to mill and is finally drawn off as product at a mill near the front of the train. Most frequently, it is drawn off from the first mill in the wet milling section.

The bagasse which leaves the last mill is sufficiently dry to permit its use as a fuel in boiler furnaces to provide steam to operate the various stages of the process. In some commercial processes, an additional mill is used at the end of the wet milling section. The purpose of this mill is to further reduce the moisture content of the bagasse in order to improve its burning characteristics. Therefore, the bagasse is not macerated prior to its entrance into this mill. This mill is called a dryer and is not considered part of the dry or wet milling sections.

FIG. 1 shows a typical mill train. The cane is cut and crushed (not shown) and fed to the first mill 1 of the train. Since no maceration has been used, this mill functions as a dry mill. The juice expressed by mill 1 is removed as product through line 20. The bagasse is then conveyed (not shown) to the next mill 2. Prior to its entrance into mill 2, the bagasse is macerated with the juice expressed by mill 3 which is returned to mill 2 through line 30. Thus, mill 2 is the first mill in the wet milling section. The juice expressed by mill 2 is collected and sent by line 21 to be combined as product with the juice of mill 1. The bagasse is ten conveyed (not shown) to mill 3. Prior to its entrance into mill 3, the bagasse is macerated with the juice expressed by mill 4, which is sent to mill 3 through line 31. The discharged bagasse from mill 3 is then conveyed (not shown) to mill 4, the last mill in the wet milling section. Prior to its entrance into mill 4, the bagasse is macerated with water which enters through line 50. The discharged bagasse from mill 4 is collected and used as the fuel in a boiler furnace.

MACERATION STEP

The type of maceration utilized is not critical to the practice of this invention. Any method which brings the imbibition liquid into contact with the rich juice in the bagasse is sufficient. Usually, either the techniques of washing, soaking or spraying are used. When utilizing washing, the imbibition liquid is deposited upon the bagasse and allowed to percolate through the blanket. To be effective, it is necessary that the blanket be saturated with liquid, thus permitting the excess juice to drip from the bottom of the blanket. Depending upon the position of the washing in the mill train, the excess juice can be removed as product or returned as the embibition liquid for a prior mill. Washing, however, is not done extensively in commercial processes because of the large amounts of liquid necessary to saturate the blanket. A second method, called soaking, involves passing the bagasse through a bath of imbibition liquid. Soaking permits contact between the bagasse and imbibition liquid throughout the blanket. A third method, and the most preferred in commercial mill trains, is one which involves spraying the blanket with the imbibition liquid. Its major advantage is that moderate amounts of imbibition can be used, thus providing adequate control of the moisture content of the bagasse. A disadvantage in this method, however, is found in the distribution of the liquid in the bagasse. Because of the affinity of the bagasse for liquid, the fibres which first contact the liquid tend to absorb the greater volume, thus starving the fibres near the center of the blanket. In order to reduce this problem, the liquid can be sprayed under pressure into the bagasse or means can be provided to mix the fibre arrangement of the blanket during its contact with the liquid.

The type of imbibition liquid which is utilized as the basis of the maceration is also not critical to the practice of this invention. It is only necessary that the basic liquid be capable of displacing the rich juice from the cells of the bagasse. In counter-current maceration, however, it is necessary that the liquid also be miscible with the expressed juices. It is not necessary, however, that the dissolved solids of the juice be soluble in the liquid. Therefore, the choice of imbibition liquid may vary. From a practical economic standpoint, water is the imbibition liquid used in the sugar industry.

The amount of water which is utilized in the maceration is dependent upon the various process conditions desired. While it is desirable from an extraction standpoint to use as much water as possible, the moisture content of the bagasse to some extent controls the speed and capacity of the mills. As the moisture content increases, it becomes more difficult to feed the bagasse into the mill. At high moisture levels, mill chokes occur. The relationship between moisture content and milling characteristics is discussed more fully later in this specification. In the sugar industry, the amount of water utilized as imbibition normally varies from 5 to 35 percent based on the weight of the original cane. If less than 5% is used, the amount of rich juice displaced is not sufficient to appreciably increase the extraction efficiency. Amounts greater than 35% can be use, but normally the decrease in milling capacity more than offsets any gain in extraction. Furthermore, the large volume of water increases the evaporation costs in the subsequent process in which the solid sugar is recovered. In most commercial sugar mills, the amount of water used varies from 10% to 35% and most commonly from 15% to 25%.

When the bagasse fibres are heated to about 180° F., the cell walls disintegrate, thus exposing the juice contained therein. For this reason, it has been found desirable to utilize a hot imbibition liquid for maceration. The liquid is usually heated to a temperature in the range of from 175 to 185° F. While the use of hot maceration does enhance cell destruction, it also makes the feeding of the mill more difficult. In most commercial attempts to use hot maceration, the resulting loss in mill capacity was greater than the gain in extraction efficiency. For this reason, hot maceration is not used extensively in commercial sugar mills. Certain embodiments of this invention, however, permit the use of both hot and cold maceration simultaneously within a single mill train without any loss in mill capacity. These embodiments are described more fully later in the specification.

In the sugar industry, maceration is further defined as follows: If the imbibition liquid applied is comprised solely of water (no juices added), it is called simple maceration. The number of mills to which the water is added determines whether it is single, double or triple, etc. simple maceration. If the imbibition liquid at prior mills is comprised of the juice of a subsequent mill, it is called compound maceration. The number of mills to which the imbibition is applied (including the mills where water alone is added) determines whether it is double, triple, etc. compound maceration. The practice of this invention lends itself most readily to compound maceration. Simple maceration at all mills, while operable in this invention, is usually uneconomical. In carrying out compound maceration, however, it is necessary to introduce water to at least one mill to provide the volume of imbibition liquid necessary for a good extraction. The practice of this invention permits the introduction of water at any mill in the train, so long as it is also added at the last mill in the wet milling section of the train. Certain embodiments of this invention lend themselves to the addition of water at both the last regular mill and the last reflux mill in the wet milling section.

MOISTURE CONTENT OF THE BAGASSE

As previously stated, the moisture content of the bagasse greatly affects both the extraction efficiency and the milling characteristics. With respect to the extraction, the moisture content of the bagasse must be sufficiently high to provide a good mixing between the natural juices and the imbibition liquid. Therefore, it is desirable to use as much imbibition liquid as possible. With respect to the milling characteristics, the wetter the bagasse the more difficult the feeding of the mill becomes. High moisture content in the bagasse lowers the frictional forces between the fibre and the roller surface and causes the rollers to slip over the bagasse rather than grip the fibres. To correct this, the mill speed and feed rate must be reduced to a point where adequate feeding occurs. At some critical moisture content, the rollers are unable to grip the bagasse at all and a mill choke results. Consequently, it is necessary to determine what optimum moisture content will provide both good extraction and adequate milling characteristics.

The moisture content of the bagasse is most conveniently expressed as the weight ratio of juice to fibre in the cane. The term "juice" refers to all of the liquid in the bagasse including both natural juice and imbibition liquid. The fibre represents all of the undissolved solids in the bagasse. In order to more fully comprehend the effect of moisture content on the extraction and milling characteristics, it is necessary to understand the physical reactions which take place in the bight between two rollers. As the bagasse enters the bight, an increasing differential of pressure is exerted. Starting with a pressure of zero immediately prior to its entrance into the bight, the bagasse is subjected to increasing pressure until a maximum pressure point is reached. As the pressure increases, more juice is expressed from the bagasse which flows counter-current to it. It is this counter-current flow of juice which determines the extraction ability of the rollers. To obtain the best extraction, the bulk flow of juice issuing from the bight of the rollers must be sufficient to wash every part of the fibre well and to provide a good mixing of natural juice and imbibition liquid. However, the bagasse must have sufficient draining ability to permit this bulk juice flow to escape over the feed side of the bottom rollers. If the drainage is not sufficient, the juice is reabsorbed by the bagasse, and it becomes too wet to feed properly into the mill. In addition, the lack of drainage will cause some of the juice to extrude forward with the bagasse through the maximum pressure point. Thereafter, it is immediately reabsorbed by the bagasse as the pressure is decreased on the delivery side of the rollers. Therefore, it has been found that it is the drainage capacity and the initial moisture content which determines the extraction and milling characteristics of the bagasse. That is to say, that at any point in the bight of the rollers, the milling characteristics are determined by the moisture content at that point, which in turn is dependent upon the drainage ability of the bagasse prior to reaching that point. Because of the difficulty in measuring moisture content in the bight of rollers, it is necessary to express the bagasse moisture as that which is present prior to its entrance into the bight. It will be apparent, however, the optimum moisture content is not absolute and will vary depending upon the type of bagasse and the particular mill being used.

The drainage ability is also dependent on the particle size of the bagasse. A coarse bagasse has a higher drainage capacity than a fine bagasse.

It has also been discovered that the drainage capacity of the bagasse is an inverse function of the roller pressure. Regular mills require a high roller pressure to accomplish fibre attrition and cell rupture. Such high pressures limit the draining ability and, therefore, lower the capacity of the mill. While drainage capacity has been found to be an inverse function of pressure, it was also discovered that this relationship is not an inversely proportional function. Specifically, it has been found that drainage, as the pressure is reduced, increases at a rate greater than the rate of pressure reduction. For example, experiments with reflux mills operating at one-tenth the pressure of a regular mill have shown that the increase in drainage capacity under this reduced pressure is about 1800%. At the same time, the amount of juice extracted is directly proportional to the pressure applied. Therefore, in the practice of this invention, it is preferred to select a reflux milling pressure which represents the optimum pressure for both juice extraction and drainage capacity of the particular bagasse.

The drainage capacity can also be improved by increasing the length of time in which the bagasse is in the pressure differential exerted by the mill rollers. This requires a reduction in mill speed and a corresponding reduction in feed rate. Such reductions, however, are not desirable and in the practice of this invention are not necessary.

REFLUX MILLS

With the foregoing description of the factors involved in the wet milling of bagasse, the reflux mills of this invention can be more fully described. Each reflux mill is comprised of at least two co-acting rollers which are capable of expressing liquid. While more than two co-acting rollers can be used in a single mill, the presence of additional rollers does not appreciably increase the extraction efficiency except when maceration is applied between the various rollers within the reflux mill. It has been found that it is more desirable to use two reflux mills, each having a single pair of co-acting rollers, in tandem rather than using a single reflux mill of more than two rolls. If space were a problem, however, a single reflux mill of three rollers could be used if maceration was applied before the bagasse entered the second bight.

It is critical to the practice of this invention that the reflux mills be operated at a pressure which is low enough to permit adequate draining of the bagasse and high enough to cause expression of the juice. In order for juice to be expressed, it is necessary that the volume of the bagasse be reduced to a point where there are no voids left in the blanket. Once this point is reached, further reduction of the volume causes the juice to drain from the blanket. If the pressure is too high, however, the draining ability of the bagasse will be reduced. When this occurs, the excess juice flows within the bagasse counter-current to its direction of travel rather than draining from it. As the mill is operated, the amount of internal juice increases and it flows further and further back through the incoming bagasse. After sufficient milling time, it reaches bagasse which has not yet entered into the pressure differential exerted by the rollers. At this point, the bagasse is not reduced to a no-void volume and, therefore, the juice is absorbed rather than expressed from the bagasse. As this reabsorption continues, the juice to fibre ratio of the bagasse increases until it is too wet to feed properly into the mill. In order to avoid a mill choke at this point, it would require a reduction in mill speed and feed rate.

It has been found that the average pressure (as previously defined) which should be exerted by a reflux mill ranges from about 5% to about 30% of the average pressure exerted by regular mills of the same diameter in the train. Preferably, it is about 10% of the pressure of the regular mill. When operating a regular mill and a reflux mill of different diameters, the percent difference in operating pressures is a function approximating the square root of the diameters of the rollers of each of the mills. For example, if a regular mill having 36" rollers were operated at 3600 p.s.i., then a reflux mill having rollers of the same diameter would preferably be operated at 0.1 (3600) or 360 p.s.i. If, however, 25" rollers were used in the reflux mill, then the preferable pressure would be about ⅚ of 360 or 300 p.s.i.

In most milling operations the average pressure exerted by the reflux mills will range from about 50 to about 800 p.s.i. Preferably, the pressure ranges from about 300 to about 500 p.s.i. most preferably it is around 400 p.s.i.

It has been found that when reflux mills are operated in the pressure range set forth above, very little cell rupturing occurs. While cell rupture is desirable, these pressures are not sufficient to cause a substantial number of them. Therefore, it is convenient to express the overall reflux mill pressure range as one which does not cause substantial cell rupture.

Other operating conditions of the reflux mill are not critical to the practice of this invention. For example, mill speed and capacity will be determined by the overall mill train and by the type of cane being processed and the degree of preparation utilized in forming the bagasse.

Because of the larger aperture between the rollers, the reflux mills can normally operate at a speed of about one-third that of a regular mill. For example, linear circumferential mill speeds of from 7 to 25 f.p.m. would be used in most commercial mill trains.

The rollers of the reflux mill can be made from any suitable material, such as stainless steel and be any diameter and length depending upon the requirements of the mill train. The length of the reflux rollers normally will be made to correspond to the length of the regular mill rollers in the train, which usually range from 36" to 84". The diameter of the reflux mill rollers can be of any dimension and usually will range from 12" to 36".

The surface of the rollers can be smooth, but preferably are roughened in such a manner to provide a more positive grip on the bagasse. For example, the actual surface of the rollers can be roughed or they can be coated with a composition, such as a plastic, which has a higher coefficient of friction than the roller surfaces. An inexpensive and practical method is to form a perforated plate or wire mesh having about ¼" square openings around the rollers. The openings in the plate or mesh become packed with bagasse which becomes hard and remains in the openings. These bagasse coated rollers have excellent feeding characteristics. The surface of the rollers can also be provided with grooves to provide better feeding characteristics. If grooving is used, there will be some attrition of the fibres as they pass through the mill. While this attrition will cause some cell rupture, it will not occur to any great extent because of the lack of pressure. It may be desirable, in order to evaluate the presence of reflux milling in a train, to reduce the pressure of a regular mill so that it will function like a reflux mill. Because of the large gearing and weight of a regular mill, however, it would not be as economical to continue to operate a regular mill in this manner.

JUICE TO FIBRE RATIO

In order to obtain a high extraction of soluble solids, it is necessary that the juice to fibre ratio (by weight) in the bagasse be sufficient to permit a high bulk flow of juice at the bight of the rollers. Therefore, it is desirable to feed the reflux mill with bagasse having as high a juice to fibre ratio as is consistent with adequate feeding capability and mill speed. The moisture content of entering bagasse is dependent upon two factors, the moisture content of the discharged bagasse from the preceding mill and the amount of imbibition liquid added in between the mills. Since the amount of dilute juice available for maceration and the moisture content of discharged bagasse is greater at front of the mill train, the highest juice to fibre ratios will normally be found there. For this reason, reflux milling operates most efficiently when carried out near the front of the mill train. Usually, the maximum juice to fibre ratios which can be obtained at these mills will be well below that which causes feeding problems. Therefore, the reflux mills can be operated at high speeds and feed rates without causing mill chokes.

While it is convenient to express extraction efficiency in terms of juice extraction (juice expressed over juice in), it is the soluble solids (sugar) extraction (solids expressed over solids in) which is the ultimate goal of the process. It has been found that soluble solids extraction becomes nearly equal to juice extraction in a reflux mill when the juice/fibre ratio of the feed bagasse is about 5.5 to 1. At this ratio, there is a sufficient flow of juice issuing from the bight of the rollers which washes the fibre well and permits a good mixing of the natural juice and imbibition liquid. In laboratory experiments with a reflux mill operating at a pressure of 160 p.s.i. and a 5.2 to 1 juice/fibre ratio, the juice extraction was 52% and the soluble solids extraction 50%. In contrast, a similarly operated two roll high pressure regular mill operating at 1600 p.s.i. and a 4.1 to 1 juice/fibre ratio would have a juice extraction of about 56% and a soluble solids extraction of about 50%. The cost differential, however, to purchase and operate these two mills results in a considerable saving in favor of the reflux mill. Laboratory reflux mills operating at 160 p.s.i. and juice to fibre ratios of 13 to 1 were found to have a juice extraction of 70% and a soluble solids extraction of 67% which is considerably higher than that obtainable with a regular mill operating commercially. For the most efficient operation of the reflux mills, the juice to fibre ratio of the feed bagasse should be high enough so that the soluble solids extraction is nearly equal that of the juice extraction. For most bagasse, this requires a juice to fibre ratio of at least 4 to 1. Preferably, the juice to fibre ratio is at least 4.5 to 1. For most commercial operations, the juice to fibre ratio in the reflux mills will range from 4.5 to 1 to 13 to 1.

It is this combination light pressure and high juice to fibre ratio in the bagasse which permits the reflux mills to function so efficiently. Because of the superior drainage characteristics, the reflux mills can handle bagasse with high moisture content without experiencing chokes or other feeding problems. For example, bagasse having a juice to fibre ratio of 13 to 1 has been easily fed to a reflux mill. In contrast regular mills normally experience feeding problems when the juice to fibre ratio exceeds 5.5 to 1.

The juice to fibre ratios of the macerated bagasse for the reflux mills have been set forth previously. The juice to fibre ratios of the macerated bagasse entering a regular mill is usually determined by the required capacity of that mill. It is desirable, however, to feed bagasse to the regular mill with as high a juice to fibre ratio as the mill can handle. Depending on the type of bagasse, most regular mills cannot handle bagasse unless this ratio is under 5.5 to 1. In many commercial operations, feeding problems are encountered if the juice to fibre ratio exceeds 4.5 to 1.

Because of the low pressures exerted by the reflux mill, the power requirements are considerably less than those of a regular three roll mill. It has been found that at a pressure of about 0.1 that of the regular mill, the power requirements are only about 2% of the regular mill. In addition, the lower mill pressures incur less wear and permit a much lighter design of rollers, thus making the replacement and maintenance costs but a fraction of that experienced with the regular mill. Furthermore, the extraction efficiency of the reflux mill can equal or exceed that of a regular mill if operated in accordance with this invention. This results in a substantial savings in both mill and its prime mover, and power and maintenance costs when the reflux mills are used in place of a regular mill in the train.

Another advantage which is inherent in the use of the reflux mills is found in the condition of the discharge bagasse. The bagasse leaves the reflux mill in a flat, compacted state having the appearance of a layer of felt. This bagasse is denser than that leaving a regular mill. Unexpectedly, it has been found that the distribution of the imbibition liquid is better in the dense bagasse than in loose bagasse. It is believed that the compacted bagasse has less capillary walls, thus providing less resistance to the displacement of the rich juice. The compacted bagasse also has superior feeding characteristics especially into a regular mill.

In order to obtain the improved extractions of this invention, it is necessary to macerate the bagasse prior to its entrance into each mill of the wet milling section of the train. If maceration is not used before a particular mill, its extraction efficiency drops off markedly, and it functions more as a dry mill. While dry milling is effective on fresh cane containing a high amount of natural juice, its efficiency decreases rapidly once the bulk of the natural juice is removed. It should be understood, however, that regular mills having feed rollers such as the pressure feed mill can be used as the high pressure mill in the practice of this invention, if desired. The lack of maceration between the feed rollers and the three roll mill, however, seriously decreases the extraction efficiency of that mill. The fact that maceration is carried out prior to the feed rollers does not affect the extraction of the subsequent three roll mill.

JUICE COLLECTION AND RETURN

The imbibition liquid which is used for maceration in the practice of this invention must be a dilute liquid which is capable of displacing the rich juice in the bagasse. As previously stated, the sugar industry uses water as the initial imbibition liquid for the mills near the end of the mill train. Once the water has been added to provide the volume of maceration desired, it is the juice of the subsequent mills which is recycled to macerate the bagasse at the beginning of the mill train. It is critical to the practice of this invention that the juices expressed by a mill be returned as the imbibition liquid for a preceding mill and not be permitted to be used as the imbibition liquid for itself. While collected juices can be commingled and the mixture used for prior maceration, the juice can not be commingled and used on the mill which expressed it. Prior methods which utilize a system of juice collection which permits the expressed juice of mill A to be commingled with the juices of subsequent mills B and C, with a portion of this mitxure used as the imbibition liquid for mill A, do not have the solids extraction efficiency which is obtained using the process of this invention.

From the above discussion, it will be apparent that three different types of juice collection and distribution can be utilized in the practice of this invention. Most preferably, the juice expressed by a mill is collected and returned as the sole imbibition liquid for the mill immediately preceding it. If this method is applied throughout the mill train, it optimizes the concentration gradient of soluble solids between the juice of the unmacerated bagasse and the imbibition liquid. The importance of this gradient is more fully disclosed later in the specification. A second method which can be utilized involves the collection of expressed juice of a mill and its return as the imbibition liquid for a prior mill which is not immediately ahead of the expressing mill in the train. This method permits the use of split maceration more fully discussed later in the specification. A third method of collection and distribution of expressed juice permits the commingling of the juices from two or more mills and the return of the mixture as the imbibition liquid for one or more mills which are prior to the expressing mills in the train. In each of these three methods, at some point in the mill train, usually near the front where the juice is the richest, the expressed juice is not further recycled, but rather is drawn off as product and processed further to recover the sugar.

In order for a juice to be suitable as an imbibition liquid for a prior mill, it is necessary that the solids content of the juice be less than the solids content of the juice in the bagasse which is to be macerated. The solids content is equal to the weight of soluble solids in the juice divided by the total weight of juice. This concentration gradient should be as large as possible and be at least one percentage point when the solids concentration of each juice is compared. Normally, this difference should be about three to six percentage points.

PREFERRED EMBODIMENTS OF THE INVENTION

The position of the reflux mill in the mill train also affects the extraction of that mill and the overall extraction of the mill train. Since the reflux mills can be operated at a higher extraction efficiency than regular mills, and are able to operate with wetter bagasse, it is preferable to place the reflux mills near the front of the wet milling section of the train where the bagasse is at its wettest and the juice is richest. Other considerations, however, may make it desirable to locate the reflux mills through out the wet milling section, or to locate them near the end of the wet mill section. In existing sugar factories, the normal space which is left between the various processing equipment will permit the addition of one or two reflux mills between the regular mills without requiring their relocation. If, however, an existing regular mill is removed from the train, four or five reflux mills can be installed. Because of the economic savings realized utilizing reflux mills, it may be desirable to remove an old regular mill to permit their installation. Some specific embodiments which utilize reflux mills and the advantages therein are given below:

FIGS. 2 through 8 show the use of reflux milling in the first portion of the wet milling section. In all of the figures in this application the following number system has been used: Numerals 1 through 9 are used to designate the regular mills; numerals 10 through 19 are reserved for reflux mills; numerals 20 through 29 designate product lines where the expressed juices were removed for further processing to recover the sugar; numerals 30 through 49 are reserved for lines which return the juice of regular mills for prior macerations; numerals 50 through 59 are used for lines which introduce water as the imbibition liquid; numerals 60 through 69 are reserved for lines which return the juice of reflux mills for prior macerations; numerals 70 through 79 are used to designate the lines in which commingled juice is returned to a prior mill as maceration; and numeral 80 is used to designate a washing station. Not all numerals within a class were used.

Figure 2:
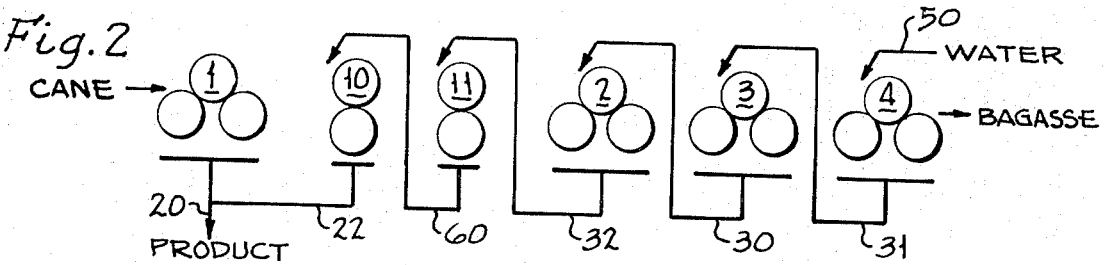
FIG. 2 is an embodiment of this invention showing two reflux mills and four regular mills operating in tandem.

FIG. 2 shows the use of two reflux mill and four regular mills operating in tandem. With reference to this figure, the cane is prepared and sent to dry mill 1 as described in FIG. 1. The juice expressed by mill 1 is removed as product through line 20. The discharged bagasse of mill 1 is then macerated with the juice expressed by reflux mill 11 which is returned to the maceration point through line 60. The macerated bagasse is then fed to reflux mill 10. The juice expressed by mill 10 is removed as product through line 22. The discharged bagasse of mill 10 is then macerated with the juice expressed by regular mill 2 which is returned to the maceration point through line 32. The macerated bagasse is then fed to reflux mill 11. The discharged bagasse of mill 11 is then macerated with the juice expressed by regular mill 3 which is returned to the maceration point through line 30. The bagasse is then fed to regular mills 2, 3 and 4 which are operated as described in FIG. 1.

Figure 3:
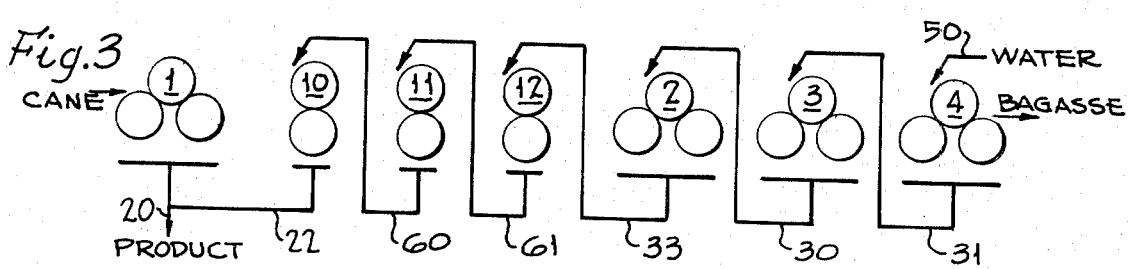
FIG. 3 is an embodiment of this invention showing three reflux mills and four regular mills operating in tandem.

FIG. 3 shows the use of three reflux mills and four regular mills operating in tandem. The cane is prepared and fed through regular mill 1 and reflux mill 10 as described in FIG. 2. The discharged bagasse of mill 10 is then macerated with the juice expressed by reflux mill 12 which is returned to the maceration point through line 61. The macerated bagasse is then fed to reflux mill 11. The discharged bagasse of mill 11 is then macerated with the juice expressed by regular mill 2 which is returned to the maceration point through line 33. The macerated bagasse is then fed to reflux mill 12. The discharged bagasse of mill 12 is then macerated with the juice expressed by regular mill 3 which is returned to the maceration point through line 30. The macerated bagasse is then fed to regular mills 2, 3 and 4 which are operated in the same manner as described in FIG. 1.

Figure 4:
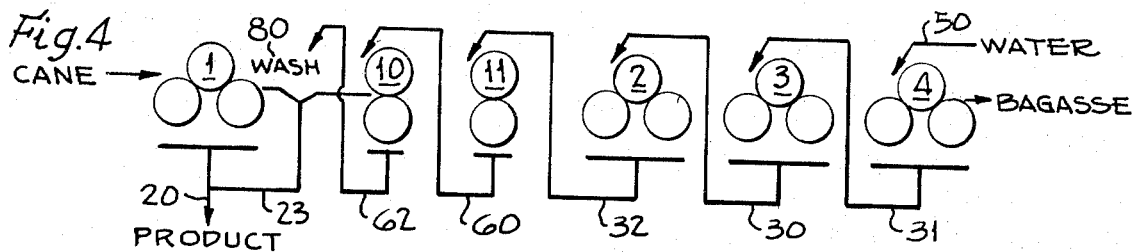
FIG. 4 is an embodiment of this invention showing two reflux mills, four regular mills and a washing station operating in tandem.

FIG. 4 shows the use of two reflux mills, four regular mills and a washing station operating in tandem. The cane is prepared and sent through dry mill 1 as described in FIG. 1. The juice expressed by mill 1 is removed as product through line 20. The bagasse from mill 1 is then passed through washing station 80 which is comprised of a perforated plate which permits the juice to drain through it. The juice of reflux mill 10 is used as the imbibition liquid for the washing stage. This juice is returned to the washing station through line 62. The juice which drains from the washing station is collected and removed as product through line 23. After washing, the bagasse is macerated with the juice expressed by reflux mill 11 which is returned to the maceration point through line 60. The macerated bagasse is then fed to reflux mills 10 and 11 and then regular mills 2, 3 and 4 which are operated in the same manner as described in FIG. 2. While the washing station is shown as the first unit in the wet milling section, it can be placed anywhere throughout this section. If it is placed further down the mill train, it is more efficient to return the juice collected from the washing for use as imbibition liquid for a prior mill rather than removing it as product.

Figure 5:
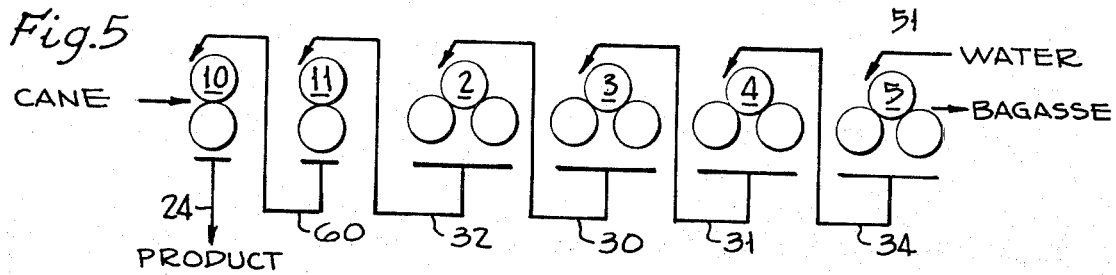
FIG. 5 is an embodiment of this invention showing two reflux mills and four regular mills operating in tandem.

FIG. 5 shows the use of two reflux mills and four regular mills operating in tandem. The cane is prepared as described in FIG. 1 and then macerated with the juice expressed by reflux mill 11 which is returned to the maceration point by line 60. No dry milling has been performed in this embodiment. The macerated cane is then fed to reflux mill 10 where the expressed juice is removed as product through line 24. The discharged bagasse from mill 10 is then macerated with the juice expressed by regular mill 2 which is returned to the maceration point through line 32. The bagasse is then sent through reflux mill 11 and regular mills 2 and 3 in the same manner as described in FIG. 2. The discharged bagasse from regular mill 3 is then macerated with the juice expressed by regular mill 5. This juice is returned to the maceration point through line 34. The macerated bagasse is then fed to regular mill 4. The discharged bagasse from mill 4 is then macerated with water which enters through line 51. The macerated bagasse is then passed through regular mill 5 and can thereafter be used as fuel for a boiler furnace.

Figure 6:
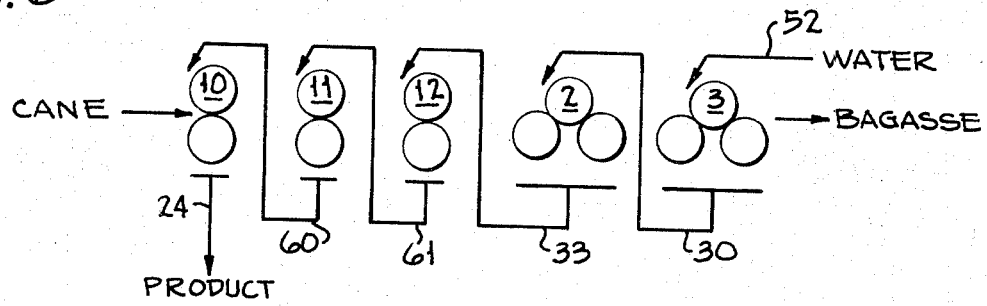
FIG. 6 is an embodiment of this invention showing three reflux mills and two regular mills operating in tandem.

FIG. 6 shows three reflux mills and two regular mills operating in tandem. The cane is prepared and sent through reflux mill 10 in the manner described in FIG. 5. The discharged bagasse of mill 10 is then macerated with the juice expressed by reflux mill 12 which is returned to the maceration point through line 61. The macerated bagasse is then fed to reflux mills 11 and 12 and regular mill 2 which are operated in the same manner as described in FIG. 3. The discharged bagasse from mill 2 is then macerated with water which enters through line 52. The macerated bagassee is then fed to regular mill 3 and can thereafter be used as fuel for a boiler furnace.

Figure 7:
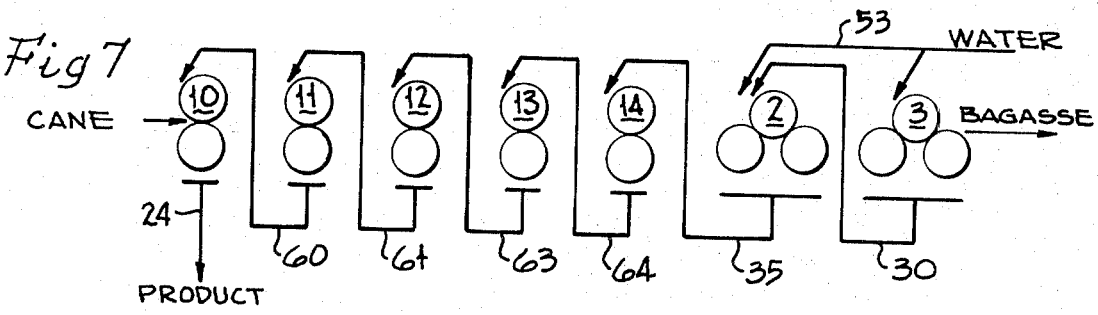
FIG. 7 is an embodiment of this invention showing five reflux mills and two regular mills operating in tandem.

FIG. 7 shows the use of five reflux mills and two regular mills operating in tandem. The cane is prepared and sent to reflux mills 10 and 11 in the manner described for FIG. 6. The discharged bagasse of mill 11 is then macerated with the juice expressed by reflux mill 13 which is returned to the maceration point through line 63. The macerated bagasse is then fed to reflux mill 13. The discharged bagasse of mill 12 is then macerated with the juice expressed by reflux mill 14 which is returned to the maceration point through line 64. The macerated bagasse is then fed to reflux mill 13. The discharged bagasse of mill 13 is then macerated with the juice expressed by regular mill 2 which is returned to the maceration point through line 35. The macerated bagasse is then fed to reflux mill 14. The discharged bagasse of mill 14 is then macerated with the juice expressed by regular mill 3 which is returned to the maceration point through line 30. The discharged bagasse from mill 14 is also macerated with water which is added through line 53. The macerated bagasse is then fed to regular mill 2. The discharged bagasse from mill 2 is then macerated with water which enters through line 53. The macerated bagasse is then fed to regular mill 3 and thereafter can be used as fuel for a boiler furnace.

Figure 8:
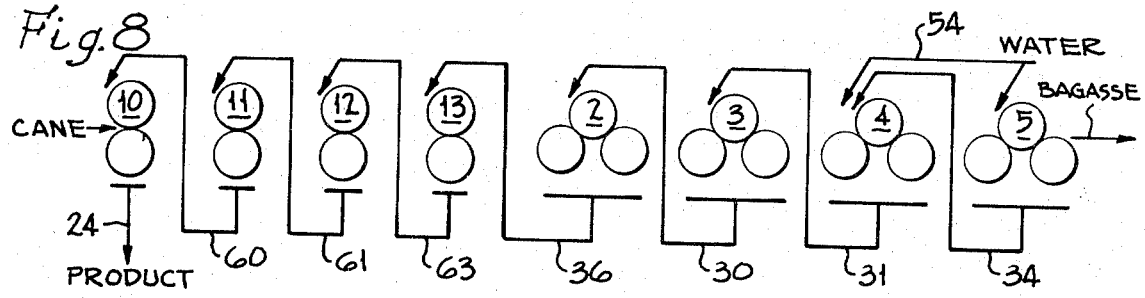
FIG. 8 is an embodiment of this invention showing four reflux mills and four regular mills operating in tandem.

FIG. 8 shows the use of four reflux mills and four regular mills operating in tandem. The cane is prepared and sent to reflux mills 10, 11 and 12 in the manner described in FIG. 7. The discharged bagasse of mill 12 is then macerated with the juice expressed by regular mill 2 which is returned to the maceration point through line 36. The macerated bagasse is then fed to reflux mill 13. The discharged bagasse of mill 13 is then macerated with the juice expresesd by regular mill 3 which is returned to the maceration point through line 30. The macerated bagasse is then fed to regular mill 2. The discharged bagasse of mill 2 is then macerated with the juice expressed by regular mill 4 which is returned to the maceration point through line 31. The macerated bagasse is then fed to regular mill 3. The discharged bagasse of mill 3 is then macerated with the juice expressed by regular mill 5 which is returned to the maceration point through line 34. The discharged bagasse from mill 3 is also macerated with water which enters through line 54. The macerated bagasse is then fed to regular mill 4. The discharged bagasse from mill 4 is then macerated with water which enters through line 54. The macerated bagasse is then fed to regular mill 5 and thereafter can be used as fuel for a boiler furance.

FIGS. 2 through 8 show the use of reflux milling in the first portion of the wet milling section of the train. This represents the most efficient placing of the reflux mills. While two to five reflux mills have been shown, it is obvious that any number of reflux or regular mills can be used depending upon the degree of extraction desired. FIG. 2 shows an embodiment of this invention which can readily be adapted to most commercial mill trains without relocating existing equipment. Two reflux mills can fit between any two existing regular mills in any tandem of standard design. Its design can be self-contained and such that it replaces the normal intermediate conveyor between mills. It can be driven by an existing mill. If a regular mill is removed, or if there is sufficient space between the dry and wet milling sections of the train, the processes shown by FIGS. 3 and 4 can easily be utilized.

FIGS. 5 through 8 show embodiments of this invention which can eliminate dry milling. While it is not necessary to avoid dry milling in these processes, the improved extraction may make dry milling unnecessary. For example, if an efficient shredder is provided, five reflux mills followed by two regular mills (FIG. 7) will give approximately 95% extraction with 30% water imbibition being split over the last two mills. The entire process can be accomplished by wet milling. The bulk of the extraction is performed with bagasse of a very high juice/fibre ratio highly suitable for reflux mills. This extraction is equivalent to that of a tandem of six to seven regular mills. However, power and space requirements are approximately half. Initial cost is also about half. Since reflux mills require 2% of the power and less than 10% of the roller pressure, maintenance costs would be fractional compared to a regular tandem.

Again, if an efficient shredder is provided to give well prepared cane, it is possible to increase the extraction efficiency of a regular tandem of four mills to over 96%, by adding four reflux mills (FIG. 8). These mills could be placed in front of the existing tandem and all milling would be accomplished by the wet process. Imbibition water can be increased from the usual 20% to over 28% and divided over two or more mills. The extraction efficiency of an existing tandem can thus be made to equal that of the modern diffusion units. The initial capital investment would be about 10% of the cost of a diffuser.

Again, presupposing a supply of well prepared shredded cane, a tandem of three reflux mills followed by two regular mills (FIG. 6) would give extractions equivalent to a normal four mill tandem. Again, power requirements would be reduced by 45%. Space requirements, maintenance, repair and replacement costs all would be reduced proportionately.

One of the advantages inherent in placing all of the reflux mills in the front of the train is that it permits the use of both hot and cold maceration simultaneously in the mill without encountering the feeding problems previously referred to. As heretofore stated, either hot or cold maceration can be used on any, or all mills in the practice of this invention. One of the simplest methods to accomplish this is to install heaters or coolers on each return line used for maceration. Thus, the temperature of the imbibition liquid at any mill can be controlled. It was pointed out before, however, that feeding problems are encountered when hot maceration is used on regular mills. This can be avoided in the practice of this invention by only using hot maceration with reflux mills which are capable of handling it. For example, with reference to FIGS. 2 through 8, heaters can be installed on lines 32, 33, 35, 36, 60, 61, 62, 63, or 64 to provide hot maceration for a particular mill. Since the returned juice at those points has already passed the regular mills in the train, its heating will not affect their performance. Another alternative would be to split the water maceration so that it is added cold at a regular mill and hot at a reflux mill. For example, in a process such as that shown by FIG. 8, cold water could be added at regular mill 5 and hot water added at reflux mill 13.

Figure 9:
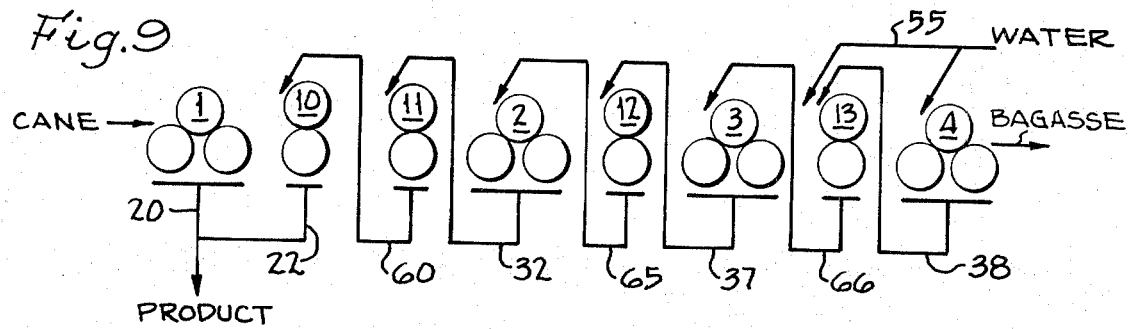
FIG. 9 is an embodiment of this invention showing four reflux mills and four regular mills operating in tandem.

FIG. 9 shows four reflux mills and four regular mills operating in tandem. The can is prepared and sent to regular mill 1 and reflux mill 10 in the same manner as described in FIG. 2. The discharged bagasse of mill 10 is then macerated with the juice expressed by regular mill 2 which is returned to the maceration point through line 32. The macerated bagasse is then fed to reflux mill 11. The discharged bagasse of mill 11 is then macerated with the juice expressed by reflux mill 12 which is returned to the maceration point through line 65. The macerated bagasse is then fed to regular mill 2. The discharged bagasse of mill 2 is then macerated with the juice expressed by regular mill 3 which is returned to the maceration point through line 37. The macerated bagasse is then fed to reflux mill 12. The discharged bagasse of mill 12 is then macerated with the juice expressed by reflux mill 13 which is returned to the maceration point through line 66. The macerated bagasse is then fed to regular mill 3. The discharged bagasse of mill 3 is then macerated with the juice expressed by regular mill 4 which is returned to the maceration point through line 38. The discharged bagasse of mill 3 is also macerated with water which is added through line 55. The macerated bagasse is then fed through reflux mill 13. The discharged bagasse from mill 13 is then macerated with water which enters by line 55. The macerated bagasse is then fed to regular mill 4 and thereafter can be used as fuel in a boiler furnace. Embodiments such as that shown by FIG. 9 can readily be used in commercial mill trains because one reflux mill can easily be installed between each regular mill in the tandem.

FIGS. 10 and 11 show other preferred embodiments of this invention. These particular embodiments utilize a unique type of split maceration not heretofore possible in commercial mill trains. In this type of process, some reflux mills are located between the regular mills throughout the mill train. The juice expressed by a particular type of mill (reflux or regular) is returned as the imbibition liquid for a mill of the same type. Thus, the juice expressed by a reflux mill is used only as the imbibition liquid for another reflux mill prior to it in the train. The same criteria is applied to the regular mills. This method also permits the use of large amounts of imbibition liquid on reflux mills which can handle it and lesser amounts on regular mills where the moisture content of the bagasse causes feeding difficulties. Furthermore, this permits the downstream reflux mills to take advantage of the additional attrition performed on the bagasse by the intervening regular mills. Thus, the bagasse entering these flux mills has had additional grinding, thus exposing more juice-bearing cells. FIG. 10 shows the use of four reflux mills and four regular mills operating in tandem with split maceration. The cane is prepared and fed to regular mill 1 as described in FIG. 1. The juice expressed by mill 1 is removed as product by line 25. The discharged bagasse from mill 1 is then macerated with the juice expressed by reflux mill 11 which is returned to the maceration point by line 60. The macerated bagasse is then fed to reflux mill 10 and the juice expressed by that mill is drawn off as product through line 24. The discharged bagasse from mill 10 is then macerated with a mixture comprising the expressed juices of regular mill 2 and reflux mill 12 which is returned to the maceration point by line 70. The macerated bagasse is then fed to reflux mill 11. The discharged bagasse of mill 11 is then macerated with the juice expressed by regular mill 3 which is returned to the maceration point through line 30. The macerated bagasse is then fed to regular mill 2. The juice expressed by mill 2 is removed by line 39 and commingled with the juice from reflux mill 12. The discharged bagasse of mill 2 is then macerated with the juice expressed by reflux mill 13 which is returned to the maceration point through line 63. The macerated bagasse is then fed to reflux mill 12. The juice expressed from mill 12 is removed by line 67 and commingled with the juice of regular mill 2. The discharged bagasse of mill 12 is then macerated with the juice expressed by regular mill 4 which is returned to the maceration point through line 31. The macerated bagasse is then fed to regular mill 3. The discharged bagasse from mill 3 is then macerated with water which enters through line 56. The macerated bagasse is then fed to reflux mill 13.' The discharged bagasse from mill 13 is then fed into regular mill 4 without any further maceration. Mill 4 acts as a dryer to prepare the bagasse for burning and is not considered part of the wet milling section. It will be apparent that the juices of mill 2 and 12 need not be commingled but can be returned to mills 10 and 11 respectively. Product could then be drawn off at both mills 10 and 11.

FIG. 11 shows three reflux mills and four regular mills operating in tandem with split hot and cold maceration. The cane is prepared and fed to dry mill 1 as described in FIG. 1. The juice expressed by mill 1 is removed as product through line 25. The discharged bagasse of mill 1 is then macerated with the hot juice expressed by reflux mill 11 which is returned to the maceration point through line 60. The macerated bagasse is then fed to reflux mill 10. The juice expressed by mill 10 is removed as product through line 24. The discharged bagasese of mill 10 is then macerated with the cold juice expressed by regular mill 3 which is returned to the maceration point through line 30. The macerated bagasse is then fed to regular mill 2. The juice expressed by mill 2 is removed as product through line 26. The discharged bagasse of mill 2 is then macerated with the hot juice expressed by reflux mill 12 which is returned to the maceration point through line 61. The macerated bagasse is then fed to reflux mill 11. The discharged bagasse of mill 11 is then macerated with the cold juice expressed by regular mill 4 which is returned to the maceration point through line 31. The macerated bagasse is then fed to regular mill 3. The discharged bagasse of mill 3 is then macerated with hot water which is added through line 57. The macerated bagasse is then fed to reflux mill 12. The discharged bagasse of mill 12 is then macerated with cold water which is added through line 50. The macerated bagasse is then passed through regular mill 4 and thereafter it can be used as fuel for a boiler furnace.

FIG. 12 shows four reflux mills and four regular mills operating in tandem with commingled maceration. The cane is prepared in the manner described in FIG. 1. The cane is then macerated with a mixture of juices from subsequent expressions. This mixture comprises all of the juice expressed by regular mill 2 which is returned by line 40 and a portion of the commingled juices of reflux mill 11 and regular mill 3 which is returned by line 71. The macerated cane is then fed to reflux mill 10. The juice expressed by mill 10 is removed as product through line 24. Upon discharge from mill 10, the bagasse is macerated with the remaining portion of the commingled juices of reflux mill 11 and regular mill 3 which is returned to the maceration point through line 71. The macerated bagasse is then fed to regular mill 2. The discharged bagasse from mill 2 is then macerated with a portion of the commingled juices of reflux mill 12 and regular mill 4 which is returned to the maceration point through line 72. The macerated bagasse is then fed into reflux mill 11. The discharged bagasse from mill 11 is then macerated with the remaining portion of the commingled juices of reflux mill 12 and regular mill 4 which is returned to the maceration point through line 72. The macerated bagasse is then sent through regular mill 3. Upon discharge from mill 3, the bagasse is macerated with a potrion of the commingled juices expressed by reflux mill 13 and regular mill 5 which is returned to the maceration point through line 73. The macerated bagasse is then sent through reflux mill 12. The discharged bagasse from mill 12 is then macerated with the remaining portion of commingled juices from reflux mill 13 and regular mill 5 which is returned to the maceration point by line 73. The macerated bagasse is then fed through regular mill 4. Upon discharge from mill 4, the bagasse is macerated with water which is added through line 58. The macerated bagasse is then fed to reflux mill 13. The discharged bagasse from mill 13 is then macerated with water which enters through line 58. The macerated bagasse is then fed to regular mill 5 and thereafter can be used as fuel in a boiler furnace.

Various embodiments of this invention have been described. It will be obvious to those skilled in the art that other embodiments can easily be constructed and that the features of various embodiments can be combined in a single system. For example, any number of mills, either regular or reflux, can be used and they can be arranged in any order. Hot or cold maceration can be introduced at any mill in the train. Expressed juices can be returned to any prior mill in the tandem. Product can be removed at any mill whose solids concentration in the juice warrants its removal.

One of the advantages inherent in the practice of this invention is that it adds only a few minutes to the total milling time. Processes which utilize reflux milling require less than about five extra minutes to perform. This can be contrasted with the diffusion type units which require an additional twenty minutes to an hour or more to be effective.

In the examples, the soluble solids concentration is given as the amount of soluble solids of the original cane which is present in the juice. For example, if 100 parts by weight is original cane contains 14 parts fibre and 86 parts juice of which 10 parts is soluble solids, the solids concentration is 10% $(10/100) \times 100$. As the juice and solids are extracted in subsequent mills, the basis for determining the solids content remains the same, i.e. 100 parts of original cane. Since the basis remains the same throughout the process, the percent solids of the cane, whether it is in the expressed juice or in the juice of the bagasse, can be compared arithmetically. For example, if bagasse containing juice with 4% solids is macerated with a juice containing 1.5% solids, the macerated bagasse will have a juice with a solids content of 5.5%. Juice concentrations are also calculated on the same basis (per 100 parts by weight original cane) and can also be compared arithmetically. In the examples, both juice and soluble solids extractions are given in this manner.

The following are examples of various embodiments of this invention. In order to obtain the extraction efficiencies for each mill in the tandem, batch runs were made. This permitted evaluation of each mill's performance and eliminated the losses which would occur from mill to mill in continuous operation. Furthermore, to simulate the action of a regular mill, a two roll mill was used. Three roll mills require a turnplate in the space between the two bottom rollers in order to direct the bagasse upward from the discharge side of the first bight to the feed side of the second bight. There is always some bagasse left on this turnplate at the end of a run. To obtain a material balance for each mill would require that the top roller of each three roll mill be removed and the bagasse collected. It would not be possible, however, to remove this roller in a sufficient amount of time to prevent evaporation of some of the moisture in the bagasse. This loss of moisture would make an accurate calculation of each mill's efficiency impossible. Therefore, two rolls were used.

The apparatus used to simulate the regular three roll mill consisted of two two-roller laboratory mills. Each mill is equipped with a feed box 4⅜" wide between sideplates. The rollers are made of 1½" diameter hot rolled heavy wall steel tubing. Each roller extends through the mill frame and is provided with a handle for turning. The rolls are placed in the mill so that one handle is on one side; the other roller handle on the other, so that two operators, one on each side of the mill may rotate the rolls in unison. The roller surfaces are flat with no grooving of any kind.

Roll load is provided by springs which are so located on the mill caps as to give a multiplying effect of two to one at the journals of the top roll. The minimum mill opening is adjustable by set nuts holding the top cap. The maximum opening of the rolls is limited by the compression space of the springs. The average pressure of the regular mill was set at 1600 p.s.i. which would correspond to a pressure of about 4000 p.s.i. in a regular 36" mill.

Ungrooved rollers were used in order to give as true a picture as possible of any variation in fibre milling rates. In order to determine the milling rate, a feed trough, or carrier, was constructed suitable for holding up to 1 kg. batches of prepared cane. An apron of fibre glass mesh screening 4¼" x 42" long was laid in the trough with the one end rolled into the bight of the rollers under full mill pressure. Subsequently, cane or bagasse samples were laid on the screen apron. As the mill rolls were rotated, both apron and cane passed through the rolls, under heavy pressure. By measuring the amount of screen used to convey the bagasse blanket as well as the time required to mill the blanket, both bulk and specific fibre milling rates were obtained.

Shredded cane of uniform fineness was used in all tests in order to eliminate variations that might occur due to cane preparation.

The reflux mills consisted of two rollers which were of the same diameter and construction as the regular mills. These mills operated at a pressure of approximately 160 p.s.i.

Test runs consisted of a series of batch tests through consecutive mills in order to simulate the action of a tandem of mills. Juice obtained after each test was collected and applied to the applicable bagasse in the next test series. Tests were continued to try and approach equilibrium. Juice from each mill was weighed and tested for solids content. Bagasse entering and leaving each mill was also weighed. Fibre and moisture of bagasse after the last milling was determined. Solids and juice content of the original cane were calculated from this data.

The percent extraction of juice and soluble solids was determined for each mill in the train. All results from tests were compared with a control standard which consisted of a series of tests with the mills operating in traditional fashion with compound maceration. Imbibition water added to all tests in Examples I through VI and IX was kept at 20% of the weight of the shredded cane sample.

It was found necessary to run a considerable number of tests for any given series to obtain juice-solids equilibrium, and consequently, sample spoilage often occurred before such equilibrium could be obtained. To avoid this, and obtain equilibrium more quickly, weights and solids content of the juices were estimated from prior runs and synthetic samples were prepared beforehand. These samples were used as the imbibition liquid for the first test run of each series. With this synthetic juice, reasonable equilibrium was reached after three milling tandem tests had been run. In most cases, an additional test was run for assurance.

The tests were carried out by passing the bagasse through the proper mills to simulate the desired tandem. The results obtained for each series after equilibrium was reached were averaged. The abbreviations "reg." and "refl." refer to regular and reflux mills respectively. The terms wet and dry refer to the manner in which the mill was operated, i.e., as a wet mill or a dry mill. All fibre, juice and soluble solids content are by weight and based on the original cane (100 parts). All ratios and percentages are based on weight.

Example I

Using the procedure previously described, test runs were made to simulate the operation of a regular mill tandem similar to that shown in FIG. 1. A tandem of four regular mills was simulated. The overall soluble solids extraction was 88.5%. The wet milling section had an overall soluble solids extraction efficiency of 62.2%. The data obtained for each individual mill is shown in Table I. This test was used as the control standard in making comparisons with other tests.

Example II

Using the procedure previously described, test runs were made to simulate the operation of a mill tandem similar to that shown in FIG. 2. The overall soluble solids extraction was 92.5%, and the soluble solids in the wet milling section was 75.5%. The data obtained for each individual mill is shown in Table II. As compared with the standard control of Example I, this mill tandem had a 4.5% improvement in overall solids extraction and a 21.4% improvemetn in wet milling extraction.

Examples III and IV

Using the test data obtained from Examples I, II and V, it was possible to calculate the extraction efficiencies of various mill tandems. The extraction of various mills at particular juice to fibre ratios of feed bagasse were measured and plotted on graphs. From these graphs, it was possible to simulate various mill tandems and to calculate the efficiencies of each mill and the overall tandem efficiency. Examples III and IV were constructed to demonstrate the extraction of mill tandems similar to those shown in FIGS. 3 and 4. The individual mill data is shown in Tables III and IV. The calculated overall extraction of soluble solids for a mill tandem similar to FIG. 3 is 93.3% with the wet milling extraction being 78.4%. This represents a 5.4% increase in overall extraction and a 26% increase in wet milling extraction as compared with the standard control.

The calculated overall extraction of soluble solids for a mill tandem similar to FIG. 4 is 92.8% with the wet milling extraction being 76.4%. This represents a gain of 4.9% increase in overall extraction and a 22.8% increase in wet milling extraction as compared with the control standard.

Examples V

Using the procedure previously described for Example I, test runs were made to simulate the operation of a mill tandem similar to that shown in FIG. 5. The overall soluble solids extraction was 92.5% and the soluble solids extraction in the wet milling section was 92.5%. The data obtained for each individual mill is shown in Table V. As compared with the standard control of Example I, this mill tandem had a 4.5% improvement in overall solids extraction and a 48.5% improvement in wet milling extraction.

Examples VI and VII

Using the calculation method described for Examples III and IV, extractions for various mill tandems similar to those shown in FIGS. 6 and 7 were constructed. The individual mill data is given in Tables VI and VII. Imbibition water was 20% for Example VI and 29.1% for Example VII.

The calculated overall extraction of soluble solids for a mill tandem similar to FIG. 6 is 90.1% with the wet milling extraction being 90.1%. This represents a 1.8% increase in overall extraction and a 44.9% increase in wet milling extraction as compared with the standard control. The calculated overall extraction of soluble solids for a mill tandem similar to FIG. 7 is 95.0% with the wet milling extraction being 95.0%. This represents a 7.4% increase in overall extraction and a 52.8% increase in wet milling extraction as compared with the standard control.

Examples VIII and IX

Using the calculation method described for Examples III and IV, extractions for various mill tandems similar to those shown in FIGS. 8 and 9 were constructed. The calculated individual mill data is given in Tables VIII and IX. The imbibition water was 28.1% for Example VIII and 20% for Example IX.

The calculated overall extraction of soluble solids for a mill tandem similar to FIG. 8 is 96.6% with the wet milling extraction being 96.6%. This represents a 9.2% increase in overall extraction and a 55.4% increase in wet milling extraction as compared with the standard control. The calculated overall extraction of soluble solids for a mill tandem similar to FIG. 9 is 93.5% with the wet milling extraction being 78.5%. This represents a 5.6% increase in overall extraction and a 26.2% increase in wet milling extraction as compared with the standard control.

Example X

Using the calculation method described in Examples III and IV, extractions were obtained for a mill tandem similar to that shown in FIG. 10. The amount of imbibition was 30%. The individual mill data is shown in Table X.

The calculated overall extraction of soluble solids for a mill tandem similar to FIG. 10 is 95.0% with the wet milling extraction being 83.8%. This represents a 7.3% increase in overall extraction and a 42% increase in wet milling extraction as compared with the standard control.

TABLE I

Example I (Figure 1) Control standard

| | Mill No. (Based on position in tandem) | | | |
|---|---|---|---|---|
| | 1 | 2 | 3 | 4 |
| Type of mill | Regular dry | Regular wet | Regular wet | Regular wet |
| Entering bagasse: | | | | |
|   Fibre content, percent | 13.9 | 13.9 | 13.9 | 13.9 |
|   Juice content, percent | 86.1 | 51.0 | 45.5 | 42.8 |
|   Juice fibre ratio | 6.2 | 3.7 | 3.3 | 3.1 |
|   Soluble solids, percent | 12.1 | 5.1 | 3.5 | 2.1 |
| Discharge bagasse: | | | | |
|   Fibre content, percent | 13.9 | 13.9 | 13.9 | 13.9 |
|   Juice content, percent | 28.3 | 23.7 | 22.8 | 21.0 |
|   Juice/fibre ratio | 2.0 | 1.7 | 1.6 | 1.5 |
|   Soluble solids, percent | 3.7 | 2.8 | 2.1 | 1.4 |
| Expressed juice: | | | | |
|   Juice, percent | 57.8 | 27.3 | 22.7 | 21.8 |
|   Soluble solids content, percent | 8.4 | 2.3 | 1.4 | 0.7 |
|   Juice expressed/juice entering, percent | 67.1 | 53.5 | 49.9 | 50.9 |
|   Soluble solids expressed/soluble solids entering, percent | 69.4 | 45.3 | 40.0 | 34.3 |
| Imbibition (water), percent | | | | 20.0 |
| Total wet mill extraction (percent soluble solids entering) | | | | 62.2 |
| Total overall extraction (percent soluble solids in cane) | | | | 88.5 |
| Reduction in losses, percent (Control standard) | | | | 0 |

NOTE.—Unless otherwise noted percentages are based on weight of original cane.

TABLE II

Example II (Figure 2)

| | Mill No. (Based on position in tandem) | | | | | |
|---|---|---|---|---|---|---|
| | 1 | 2 | 3 | 4 | 5 | 6 |
| Type of mill | Regular dry | Reflux wet | Reflux wet | Regular wet | Regular wet | Regular wet |
| Entering bagasses: | | | | | | |
|   Fibre content, percent | 13.9 | 13.9 | 13.9 | 13.9 | 13.9 | 13.9 |
|   Juice content, percent | 86.1 | 61.7 | 68.5 | 59.1 | 47.0 | 43.0 |
|   Juice/fibre ratio | 6.2 | 4.4 | 4.9 | 4.3 | 3.4 | 3.1 |
|   Soluble solids, percent | 12.1 | 6.4 | 5.6 | 3.9 | 2.3 | 1.4 |
| Discharge bagasse: | | | | | | |
|   Fibre content, percent | 13.9 | 13.9 | 13.9 | 13.9 | 13.9 | 13.9 |
|   Juice content, percent | 28.3 | 34.4 | 35.1 | 25.0 | 23.0 | 21.0 |
|   Juice/fibre ratio | 2.0 | 2.5 | 2.5 | 1.8 | 1.7 | 1.5 |
|   Soluble solids, percent | 3.7 | 3.6 | 2.9 | 1.9 | 1.4 | 0.9 |
| Expressed juice: | | | | | | |
|   Juice, percent | 57.8 | 27.3 | 33.4 | 34.1 | 24.0 | 22.0 |
|   Soluble solids content, percent | 8.4 | 2.8 | 2.7 | 2.0 | 0.9 | 0.5 |
|   Juice expressed/juice entering, percent | 67.1 | 44.3 | 48.7 | 57.7 | 51.0 | 51.0 |
|   Soluble solids expressed/soluble solids entering, percent | 69.4 | 43.5 | 48.2 | 51.3 | 39.0 | 36.0 |
| Imbibition (water), percent | | | | | | 20.0 |
| Total wet mill extraction (percent soluble solids entering) | | | | | | 75.5 |
| Total overall extraction (percent soluble solids in cane) | | | | | | 92.5 |
| Reduction in losses, percent | | | | | | 34.8 |

NOTE.—Unless otherwise noted percentages are based on weight of original cane.

TABLE III

Example III (Figure 3)

| | Mill No. (Based on position in tandem) | | | | | | |
|---|---|---|---|---|---|---|---|
| | 1 | 2 | 3 | 4 | 5 | 6 | 7 |
| Type of mill | Regular dry | Reflux wet | Reflux wet | Reflux wet | Regular wet | Regular wet | Regular wet |
| Entering bagasse: | | | | | | | |
| Fibre content, percent | 13.9 | 13.9 | 13.9 | 13.9 | 13.9 | 13.9 | 13.9 |
| Juice content, percent | 86.1 | 61.6 | 68.5 | 69.4 | 59.3 | 47.2 | 43.0 |
| Juice/fibre ratio | 6.2 | 4.4 | 4.9 | 5.0 | 4.3 | 3.4 | 3.1 |
| Soluble solids, percent | 12.1 | 6.8 | 6.3 | 5.0 | 3.4 | 2.0 | 1.2 |
| Discharge bagasse: | | | | | | | |
| Fibre content, percent | 13.9 | 13.9 | 13.9 | 13.9 | 13.9 | 13.9 | 13.9 |
| Juice content, percent | 28.3 | 34.3 | 35.2 | 35.2 | 25.1 | 23.0 | 21.0 |
| Juice/fibre ratio | 2.0 | 2.5 | 2.5 | 2.5 | 1.8 | 1.7 | 1.5 |
| Soluble solids, percent | 3.7 | 3.9 | 3.2 | 2.6 | 1.6 | 1.2 | 0.8 |
| Expressed juice: | | | | | | | |
| Juice, percent | 57.8 | 27.3 | 33.3 | 34.2 | 34.2 | 24.1 | 22.0 |
| Soluble solids content, percent | 8.4 | 2.9 | 3.1 | 2.4 | 1.8 | 0.8 | 0.4 |
| Juice expressed/juice entering, percent | 67.1 | 44.3 | 48.6 | 49.3 | 57.7 | 51.0 | 51.1 |
| Soluble solids expressed/soluble solids entering, percent | 69.4 | 42.6 | 49.2 | 48.0 | 53.0 | 40.0 | 33.4 |
| Imbibition (water), percent | | | | | | | 20.0 |
| Total wet mill extraction (percent soluble solids entering) | | | | | | | 78.4 |
| Total overall extraction (percent solids in cane) | | | | | | | 93.3 |
| Reduction in losses, percent | | | | | | | 41.7 |

NOTE.—Unless otherwise noted percentages are based on weight of original cane.

TABLE IV

Example IV (Figure 4)

| | Mill No. (Based on position in tandem) | | | | | | |
|---|---|---|---|---|---|---|---|
| | 1 | 2 | 3 | 4 | 5 | 6 | 7 |
| Type of mill | Regular dry | Wash | Reflux wet | Reflux wet | Regular wet | Regular wet | Regular wet |
| Entering bagasse: | | | | | | | |
| Fibre content, percent | 13.9 | 13.9 | 13.9 | 13.9 | 13.9 | 13.9 | 13.9 |
| Juice content, percent | 86.1 | 112.0 | 131.0 | 85.0 | 63.8 | 48.0 | 43.2 |
| Juice/fibre ratio | 6.2 | 8.1 | 9.4 | 6.1 | 4.6 | 3.5 | 3.1 |
| Soluble solids, percent | 12.1 | 11.8 | 12.7 | 6.8 | 4.1 | 2.4 | 1.4 |
| Discharge bagasse: | | | | | | | |
| Fibre content, percent | 13.9 | 13.9 | 13.9 | 13.9 | 13.9 | 13.9 | 13.9 |
| Juice content, percent | 28.3 | 85.0 | 47.0 | 39.0 | 25.8 | 23.2 | 21.0 |
| Juice/fibre ratio | 2.0 | 6.1 | 3.4 | 2.8 | 1.9 | 1.7 | 1.5 |
| Soluble solids, percent | 3.7 | 9.0 | 4.6 | 3.1 | 1.9 | 1.4 | 0.9 |
| Expressed juice: | | | | | | | |
| Juice, percent | 57.8 | 27.3 | 84.0 | 46.0 | 38.0 | 24.8 | 22.2 |
| Soluble solids content, percent | 8.4 | 2.8+ | 8.1 | 3.7 | 2.2 | 1.0 | 0.5 |
| Juice expressed/juice entering, percent | 67.1 | 24.4 | 64.1 | 54.1 | 59.5 | 51.7 | 51.3 |
| Soluble solids expressed/soluble solids entering, percent | 69.4 | 24.0 | 63.7 | 54.4 | 53.7 | 41.7 | 35.7 |
| Imbibition (water), percent | | | | | | | 20.0 |
| Total wet mill extraction (percent soluble solids entering) | | | | | | | 76.4 |
| Total overall extraction (percent soluble solids in cane) | | | | | | | 92.8 |
| Reduction in losses, percent | | | | | | | 37.4 |

NOTE.—Unless otherwise noted percentages are based on weight of original cane.

TABLE V

Example V (Figure 5)

| | Mill No. (Based on position in tandem) | | | | | |
|---|---|---|---|---|---|---|
| | 1 | 2 | 3 | 4 | 5 | 6 |
| Type of mill | Reflux wet | Reflux wet | Regular wet | Regular wet | Regular wet | Regular wet |
| Entering bagasse: | | | | | | |
| Fibre content, percent | 13.9 | 13.9 | 13.9 | 13.9 | 13.9 | 13.9 |
| Juice content, percent | 136.0 | 92.5 | 68.0 | 48.7 | 45.1 | 42.8 |
| Juice/fibre ratio | 9.8 | 6.7 | 4.9 | 3.5 | 3.3 | 3.1 |
| Soluble solids, percent | 17.5 | 9.4 | 5.4 | 3.2 | 2.3 | 1.4 |
| Discharge bagasse: | | | | | | |
| Fibre content, percent | 13.9 | 13.9 | 13.9 | 13.9 | 13.9 | 13.9 |
| Juice content, percent | 50.9 | 42.6 | 26.4 | 23.3 | 22.8 | 21.0 |
| Juice/fibre ratio | 3.7 | 3.1 | 1.9 | 1.7 | 1.6 | 1.5 |
| Soluble solids, percent | 6.3 | 4.0 | 2.3 | 1.8 | 1.4 | 0.9 |
| Expressed juice: | | | | | | |
| Juice, percent | 85.1 | 49.9 | 41.6 | 25.4 | 22.3 | 21.8 |
| Soluble solids content, percent | 11.2 | 5.4 | 3.1 | 1.4 | 0.9 | 0.5 |
| Juice expressed/juice entering, percent | 62.5 | 53.9 | 61.2 | 52.2 | 49.4 | 50.9 |
| Soluble solids expressed/soluble solids entering, percent | 64.0 | 57.4 | 57.4 | 43.8 | 39.2 | 35.7 |
| Imbibition (water), percent | | | | | | 20.0 |
| Total wet mill extraction (percent soluble solids entering) | | | | | | 92.5 |
| Total overall extraction (percent soluble solids in cane) | | | | | | 92.5 |
| Reduction in losses, percent | | | | | | 34.8 |

NOTE.—Unless otherwise noted percentages are based on weight of original cane.

TABLE VI

Example VI (Figure 6)

| Type of mill | Mill No. (Based on position in tandem) | | | | |
|---|---|---|---|---|---|
| | 1 Reflux wet | 2 Reflux wet | 3 Reflux wet | 4 Regular wet | 5 Regular wet |
| Entering bagasse: | | | | | |
| Fibre content, percent | 13.9 | 13.9 | 13.9 | 13.9 | 13.9 |
| Juice content, percent | 135.0 | 86.0 | 73.1 | 60.4 | 36.9 |
| Juice fibre/ratio | 9.7 | 6.2 | 5.3 | 4.3 | 2.7 |
| Soluble solids, percent | 17.1 | 9.0 | 5.7 | 3.2 | 1.5 |
| Discharge bagasse: | | | | | |
| Fibre content, percent | 13.9 | 13.9 | 13.9 | 13.9 | 13.9 |
| Juice content, percent | 47.9 | 37.6 | 35.0 | 24.9 | 19.5 |
| Juice/fibre ratio | 2.4 | 2.7 | 2.5 | 1.8 | 1.4 |
| Soluble solids, percent | 6.2 | 4.1 | 2.9 | 1.5 | 1.2 |
| Expressed juice: | | | | | |
| Juice, percent | 86.6 | 48.4 | 38.1 | 35.5 | 17.4 |
| Soluble solids content, percent | 10.9 | 5.0 | 2.9 | 1.7 | 0.4 |
| Juice expressed/juice entering, percent | 64.2 | 56.3 | 52.1 | 58.8 | 47.2 |
| Soluble solids expressed/soluble solids entering, percent | 63.7 | 55.5 | 50.8 | 53.1 | 26.7 |
| Imbibition (water), percent | | | | | 20.0 |
| Total wet mill extraction (percent soluble solids entering) | | | | | 90.1 |
| Total overall extraction (percent soluble solids in cane) | | | | | 90.1 |
| Reduction in losses, percent | | | | | 13.9 |

NOTE.—Unless otherwise noted percentages are based on weight of original cane.

TABLE VII

Example VII (Figure 7)

| Type of mill | Mill No. (Based on position in tandem) | | | | | | |
|---|---|---|---|---|---|---|---|
| | 1 Reflux wet | 2 Reflux wet | 3 Reflux wet | 4 Reflux wet | 5 Reflux wet | 6 Regular wet | 7 Regular wet |
| Entering bagasse: | | | | | | | |
| Fibre content, percent | 13.9 | 13.9 | 13.9 | 13.9 | 13.9 | 13.9 | 13.9 |
| Juice content, percent | 146.0 | 100.0 | 87.5 | 84.8 | 84.3 | 75.2 | 37.4 |
| Juice/fibre ratio | 10.5 | 7.2 | 6.3 | 6.1 | 6.1 | 5.4 | 2.7 |
| Soluble solids, percent | 17.7 | 9.9 | 6.9 | 4.9 | 3.3 | 1.7 | 0.7 |
| Discharge bagasse: | | | | | | | |
| Fibre content, percent | 13.9 | 13.9 | 13.9 | 13.9 | 13.9 | 13.9 | 13.9 |
| Juice content, percent | 50.4 | 40.1 | 37.9 | 37.4 | 37.4 | 28.3 | 19.6 |
| Juice/fibre ratio | 3.6 | 2.9 | 2.7 | 2.7 | 2.7 | 2.0 | 1.4 |
| Soluble solids, percent | 6.2 | 4.3 | 3.2 | 2.3 | 1.6 | 0.7 | 0.6 |
| Expressed juice: | | | | | | | |
| Juice, percent | 95.6 | 59.9 | 49.6 | 47.4 | 46.9 | 46.9 | 17.8 |
| Soluble solids content, percent | 11.5 | 5.6 | 3.7 | 2.6 | 1.7 | 1.0 | 0.1 |
| Juice expressed/juice entering, percent | 65.5 | 59.9 | 56.8 | 55.8 | 55.6 | 62.4 | 47.6 |
| Soluble solids expressed/soluble solids entering, percent | 65.0 | 56.6 | 53.5 | 53.0 | 51.5 | 58.7 | 14.3 |
| Imbibition (water), percent | | | | | | | 29.1 |
| Total wet mill extraction (percent soluble solids entering) | | | | | | | 95.0 |
| Total overall extraction (percent soluble solids in cane) | | | | | | | 95.0 |
| Reduction in losses, percent | | | | | | | 56.5 |

NOTE.—Unless otherwise noted percentages are based on weight of original cane.

TABLE VIII

Example VIII (Figure 8)

| Type of mill | Mill No. (Based on position in tandem) | | | | | | | |
|---|---|---|---|---|---|---|---|---|
| | 1 Reflux wet | 2 Reflux wet | 3 Reflux wet | 4 Reflux wet | 5 Regular wet | 6 Regular wet | 7 Regular wet | 8 Regular wet |
| Entering bagasse: | | | | | | | | |
| Fibre content, percent | 13.9 | 13.9 | 13.9 | 13.9 | 13.9 | 13.9 | 13.9 | 13.9 |
| Juice content, percent | 146.0 | 100.0 | 87.5 | 84.8 | 77.7 | 66.5 | 60.6 | 33.0 |
| Juice/fibre ratio | 10.5 | 7.2 | 6.3 | 6.1 | 5.6 | 4.8 | 4.4 | 2.4 |
| Soluble solids, percent | 17.6 | 9.8 | 7.2 | 5.5 | 3.7 | 2.0 | 1.0 | 0.5 |
| Discharge bagasse: | | | | | | | | |
| Fibre content, percent | 13.9 | 13.9 | 13.9 | 13.9 | 13.9 | 13.9 | 13.9 | 13.9 |
| Juice content, percent | 50.4 | 40.1 | 37.9 | 37.4 | 30.8 | 26.2 | 24.9 | 18.6 |
| Juice/fibre ratio | 3.6 | 2.9 | 2.7 | 2.7 | 2.2 | 1.9 | 1.8 | 1.3 |
| Soluble solids, percent | 5.9 | 4.3 | 3.3 | 2.6 | 1.5 | 0.9 | 0.5 | 0.4 |
| Expressed juice: | | | | | | | | |
| Juice, percent | 95.6 | 59.9 | 49.6 | 47.4 | 46.9 | 40.3 | 35.7 | 14.4 |
| Soluble solids content, percent | 11.7 | 5.5 | 3.9 | 2.9 | 2.2 | 1.1 | 0.5 | 0.1 |
| Juice expressed/juice entering percent | 65.5 | 59.9 | 56.8 | 55.9 | 60.4 | 60.6 | 58.9 | 43.6 |
| Soluble solids expressed/soluble solids entering, percent | 66.5 | 56.1 | 54.1 | 52.7 | 59.5 | 55.1 | 50.0 | 20.0 |
| Imbibition (water), percent | | | | | | | | 28.1 |
| Total wet mill extraction (percent soluble solids entering) | | | | | | | | 96.6 |
| Total overall extraction (percent soluble solids in cane) | | | | | | | | 96.6 |
| Reduction in losses, percent | | | | | | | | 70.4 |

NOTE.—Unless otherwise noted percentages are based on weight of original cane.

TABLE IX
Example IX (Figure 9)

| Type of mill | Mill No. (Based on position in tandem) | | | | | | | |
|---|---|---|---|---|---|---|---|---|
| | 1 | 2 | 3 | 4 | 5 | 6 | 7 | 8 |
| | Regular dry | Reflux wet | Reflux wet | Regular wet | Reflux wet | Regular wet | Reflux wet | Regular wet |
| Entering bagasse: | | | | | | | | |
| Fibre content, percent | 13.9 | 13.9 | 13.9 | 13.9 | 13.9 | 13.9 | 13.9 | 13.9 |
| Juice content, percent | 86.1 | 61.6 | 68.5 | 59.3 | 58.0 | 57.7 | 51.6 | 42.8 |
| Juice/fibre ratio | 6.2 | 4.4 | 4.9 | 4.3 | 4.2 | 4.2 | 3.7 | 3.1 |
| Soluble solids, percent | 12.1 | 6.6 | 6.1 | 4.6 | 3.5 | 2.6 | 1.7 | 1.2 |
| Discharge bagasse: | | | | | | | | |
| Fibre content, percent | 13.9 | 13.9 | 13.9 | 13.9 | 13.9 | 13.9 | 13.9 | 13.9 |
| Juice content, percent | 28.3 | 34.3 | 35.2 | 25.1 | 33.9 | 24.8 | 27.8 | 21.0 |
| Juice/fibre ratio | 2.0 | 2.5 | 2.5 | 1.8 | 2.4 | 1.8 | 2.0 | 1.5 |
| Soluble solids, percent | 3.7 | 3.7 | 3.2 | 2.2 | 2.1 | 1.3 | 1.2 | 0.8 |
| Expressed juice: | | | | | | | | |
| Juice, percent | 57.8 | 27.3 | 33.3 | 34.2 | 24.1 | 32.9 | 23.8 | 21.8 |
| Soluble solids content, percent | 8.4 | 2.9 | 2.9 | 2.4 | 1.4 | 1.3 | 0.5 | 0.4 |
| Juice expressed/juice entering, percent | 67.1 | 43.3 | 48.6 | 57.7 | 41.6 | 57.0 | 46.1 | 51.0 |
| Soluble solids expressed/soluble solids entering, percent | 69.4 | 43.9 | 47.5 | 52.1 | 40.0 | 50.0 | 29.4 | 33.3 |
| Imbibition (water), percent | | | | | | | | 20.0 |
| Total wet mill extraction (percent soluble solids entering) | | | | | | | | 78.5 |
| Total overall extraction (percent soluble solids in cane) | | | | | | | | 93.5 |
| Reduction in losses, percent | | | | | | | | 43.5 |

Note.—Unless otherwise noted percentages are based on weight of original cane.

TABLE X
Example X (Figure 10)

| Type of mill | Mill No. (Based on position in tandem) | | | | | | | |
|---|---|---|---|---|---|---|---|---|
| | 1 | 2 | 3 | 4 | 5 | 6 | 7 | 8 |
| | Regular dry | Reflux wet | Reflux wet | Regular wet | Reflux wet | Regular wet | Reflux wet | Regular wet |
| Entering bagasse: | | | | | | | | |
| Fibre content, percent | 13.9 | 13.9 | 13.9 | 13.9 | 13.9 | 13.9 | 13.9 | 13.9 |
| Juice content, percent | 86.1 | 72.8 | 81.3 | 57.9 | 45.3 | 43.9 | 52.6 | 32.1 |
| Juice/fibre ratio | 6.2 | 5.2 | 5.9 | 4.2 | 3.3 | 3.2 | 3.8 | 2.3 |
| Soluble solids, percent | 12.1 | 6.3 | 4.8 | 2.7 | 1.6 | 1.4 | 0.9 | 0.6 |
| Discharge bagasse: | | | | | | | | |
| Fibre content, percent | 13.9 | 13.9 | 13.9 | 13.9 | 13.9 | 13.9 | 13.9 | 13.9 |
| Juice content, percent | 28.3 | 35.5 | 36.6 | 24.8 | 32.6 | 22.6 | 32.1 | 20.8 |
| Juice/fibre ratio | 2.0 | 2.6 | 2.6 | 1.8 | 2.4 | 1.6 | 2.3 | 1.5 |
| Soluble solids, percent | 3.7 | 3.1 | 2.2 | 1.3 | 1.4 | 0.9 | 0.6 | 0.6 |
| Expressed juice: | | | | | | | | |
| Juice, percent | 57.8 | 37.3 | 44.7 | 33.1 | 12.7 | 21.3 | 20.5 | 11.3 |
| Soluble solids content, percent | 8.4 | 3.1 | 2.6 | 1.4 | 0.3 | 0.5 | 0.3 | 0.1 |
| Juice expressed/juice entering, percent | 67.1 | 51.2 | 55.0 | 57.2 | 28.1 | 48.5 | 38.9 | 35.2 |
| Soluble solids expressed/soluble solids entering, percent | 69.4 | 49.2 | 54.2 | 51.8 | 18.8 | 35.7 | 33.3 | 16.7 |
| Imbibition (water), percent | | | | | | | | 30.0 |
| Total wet mill extraction (percent soluble solids entering) | | | | | | | | 83.8 |
| Total overall extraction (percent soluble solids in cane) | | | | | | | | 95.0 |
| Reduction in losses, percent | | | | | | | | 56.5 |

Note.—Unless otherwise noted percentages are based on weight of original cane.

I claim:

1. A process for removing sugar-bearing liquid from sugar cane bagasse which comprises:
   (a) subjecting the bagasse to a series of high and low pressure wet extractions operating in tandem,
     each low pressure extraction comprising the steps of macerating the bagasse with an imbibition liquid and subjecting the macerated bagasse to an average pressure ranging from about 50 to 800 p.s.i. which expresses a portion of the imbibition liquid and natural liquid without causing substantial rupture of the liquid-bearing cells,
     each high pressure extraction comprising the steps of macerating the bagasse with an imbibition liquid and subjecting the macerated bagasse to an average pressure ranging from about 2000 to about 5000 p.s.i. which expresses a portion of the imbibition liquid and natural liquid and ruptures liquid-bearing cells,
   (b) returning the liquids expressed from the feed side of an extraction as imbibition liquid for at least one prior maceration, and
   (c) removing expressed liquid from at least the first extraction as product.

2. A process according to claim 1 wherein the average pressure in the low pressure extraction ranges from about 300 to about 500 p.s.i.

3. A process according to claim 1 wherein the pressure in the low pressure extraction is exerted by at least two co-acting rollers.

4. A process according to claim 1 wherein at least one low pressure extraction is carried out prior to each high pressure extraction in the tandem.

5. A process according to claim 1 wherein the average pressure in the high pressure extraction ranges from about 3,000 to about 4,000 p.s.i.

6. A process according to claim 1 wherein from three to seven high pressure extractions are carried out in the tandem.

7. A process according to claim 1 wherein the pressure in the high pressure extraction is exerted by three co-acting rollers.

8. A process according to claim 1 wherein hot imbibition liquid is used in the low pressure extractions in the tandem.

9. A process according to claim 1 wherein the expressed liquids of an extraction are returned as the imbibition liquid for the extraction which immediately precedes it in the tandem.

10. A process according to claim 1 wherein the expressed liquids of at least two extractions are commingled and returned as the imbibition liquid for at least one extraction preceding them in the tandem.

11. A process according to claim 1 wherein product is removed from the first extraction in the tandem.

12. A process according to claim 1 wherein product is removed from at least two extractions in the tandem.

13. A process according to claim 1 wherein all of the low pressure extractions are carried out prior to the high pressure extractions in the tandem.

14. A process according to claim 13 wherein from two to five low pressure extractions are carried out in the immediate tandem.

15. A process according to claim 1 wherein from two to eight low pressure extractions are carried out in the tandem.

16. A process according to claim 15 wherein at least two low pressure extractions are carried out in immediate tandem.

17. A process according to claim 1 wherein the expressed liquids of a low pressure extraction are returned as the imbibition liquid for another low pressure extraction which precedes it in the tandem and the expressed liquids of a high pressure extraction are returned as the imbibition liquid for another high pressure extraction which precedes it in the tandem.

18. A process according to claim 17 wherein hot imbibition liquid is used in the low pressure extractions and cold imbibition liquid is used in the high pressure extractions.

19. A process according to claim 1 wherein the juice to fibre weight ratio of the macerated bagasse entering a low pressure expression is greater than 4.5 to 1.

20. A process according to claim 19 wherein the juice to fibre weight ratio ranges from 4.5 to 1 to 13 to 1.

21. A process according to claim 1 wherein the fresh imbibition liquid is water.

22. A process according to claim 21 wherein the amount of fresh imbibition liquid ranges from about 5 to about 35 percent by weight based on the weight of the original cane.

23. A process according to claim 22 wherein the amount of fresh imbibition liquid ranges from about 15 to about 25 percent.

24. A process according to claim 1 wherein fresh imbibition liquid is introduced into at least two extractions in the tandem.

25. A process according to claim 24 wherein the fresh imbibition liquid is introduced into at least one low pressure extraction and at least one high pressure extraction in the tandem.

26. A process according to claim 25 wherein hot fresh imbibition liquid is introduced into at least one low pressure extraction and cold fresh imbibition liquid is introduced into at least one high pressure extraction in the tandem.

27. A process for removing sugar-bearing liquid from sugar cane bagasse which comprises:
(a) subjecting the bagasse to a series of high and low pressure wet extractions operating in tandem,
each low pressure extraction comprising the steps of macerating the bagasse with an imbibition liquid and subjecting the macerated bagasse to an average pressure ranging from about 50 to about 800 p.s.i. which expresses a portion of the imbibition liquid and natural liquid,
each high pressure extraction comprising the steps of macerating the bagasse with an imbibition liquid and subjecting the macerated bagasse to an average pressure ranging from about 2,000 to about 5,000 p.s.i. which expresses a portion of the imbibition liquid and natural liquid,
(b) returning the expressed liquids from each extraction save the first as imbibition liquid for a prior maceration, and
(c) removing expressed liquid from the first extraction as product.

28. Apparatus for removing sugar-bearing liquid from sugar cane bagasse which comprises:
(a) a series of low and high pressure wet extraction means operating along a flow stream for the bagasse
($a^1$) each low pressure wet extraction means comprising means for macerating the bagasse with an imbibition liquid and pressure means for subjecting the macerated bagasse to an average pressure ranging from about 50 to about 800 p.s.i. which expresses a portion of the imbibition upstream of the low pressure means without causing substantial rupture of the liquid-bearing cells,
($a^2$) each high pressure wet extraction means comprising means for macerating the bagasse with an imbibition liquid and pressure means for subjecting the macerated bagasse to an average pressure ranging from about 2,000 to about 5,000 p.s.i. which expreses a portion of the imbibition liquid and natural liquid upstream of the high pressure means and which substantially ruptures liquid-bearing cells
(b) means for returning expressed liquids from the upstream sides of each of said pressure means save the first, as imbibition liquid for an upstream maceration, and
(c) means for removing expressed liquid from the upstream side of at least the first pressure means as product.

29. An apparatus according to claim 28 wherein the pressure means comprise at least two co-acting rollers.

30. An apparatus according to claim 29 wherein at least one roller is circumferentially enclosed with a perforated plate.

31. An apparatus according to claim 29 wherein at least one roller is circumferentially enclosed with a wire mesh.

References Cited

UNITED STATES PATENTS

| | | | |
|---|---|---|---|
| 179,679 | 7/1876 | Bringier | 127—6 |
| 480,571 | 8/1892 | Faron | 127—6 |
| 787,102 | 4/1904 | Lorenz | 127—6 X |
| 820,074 | 5/1906 | Spelman | 127—6 X |
| 757,296 | 4/1904 | Gibbens | 127—6 X |
| 838,818 | 12/1906 | Spelman | 127—4 X |
| 1,015,941 | 1/1912 | Corcuera | 127—4 X |
| 1,353,349 | 9/1920 | Krafft | 127—2 |

MORRIS O. WOLK, Primary Examiner

S. MARANTZ, Assistant Examiner

U.S. Cl. X.R.

100—37, 73; 127—5, 45